US012794675B2

(12) United States Patent
Osborn et al.

(10) Patent No.: US 12,794,675 B2

(45) Date of Patent: Nov. 10, 2026

(54) MULTI-MODAL ACCESS TO AN ONLINE SERVICE USING HIERARCHICAL CRYPTOGRAPHIC KEYS FOR USER AUTHENTICATION OF ACCOUNTS AND SUBACCOUNTS

(71) Applicant: Capital One Services, LLC, McLean, VA (US)

(72) Inventors: Kevin Osborn, Newton Highlands, MA (US); Cara Weikel, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 316 days.

(21) Appl. No.: 18/100,053

(22) Filed: Jan. 23, 2023

(65) Prior Publication Data

US 2024/0250806 A1 Jul. 25, 2024

(51) Int. Cl.

*H04L 9/00* (2022.01)

*G06Q 20/36* (2012.01)

(Continued)

(52) U.S. Cl.

CPC ........... *H04L 9/0825* (2013.01); *G06Q 20/36* (2013.01); *H04L 9/007* (2013.01); *H04L 9/0819* (2013.01); (Continued)

(58) Field of Classification Search

CPC ..... H04L 9/007; H04L 9/0819; H04L 63/064; H04L 63/083; H04L 63/102

See application file for complete search history.

(56) References Cited

U.S. PATENT DOCUMENTS 4,683,553 A 7/1987 Mollier 4,827,113 A 5/1989 Rikuna (Continued)

FOREIGN PATENT DOCUMENTS

CA 3010336 A1 7/2017

CN 101192295 A 6/2008

(Continued)

OTHER PUBLICATIONS

The International Search Report and Written Opinion mailed Apr. 30, 2024, for corresponding PCT/US24/12374 (eight (8) pages).

(Continued)

*Primary Examiner* — David J Pearson

(74) *Attorney, Agent, or Firm* — KDW Firm PLLC

(57) ABSTRACT

The exemplary embodiments may provide a password-less user authentication mechanism that enables users to be authenticated for accessing an online service. The online service may be, for example, a website that provides a service. A user registers with the online service and then is given a private cryptographic key that is used to gain access to the online service. The exemplary embodiments enable the creation of subaccounts that are affiliated with an account. At least one offspring cryptographic key pair for user authentication may be generated for each subaccount. The offspring cryptographic key pairs are derived from the primary cryptographic key pair for user authentication that is associated with the account. The offspring key cryptographic key pairs are used to gain access to the online service via a subaccount. Each subaccount may have different modes of access. Each subaccount may have different authorizations relative to use of the online service.

21 Claims, 23 Drawing Sheets

(51) Int. Cl.
*H04L 9/08* (2006.01)
*H04L 9/40* (2022.01)

(52) U.S. Cl.
CPC ............ *H04L 9/088* (2013.01); *H04L 63/064* (2013.01); *H04L 63/083* (2013.01); *H04L 63/102* (2013.01)

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |

(56) References Cited

U.S. PATENT DOCUMENTS

| | | | |
|---|---|---|---|
| 8,276,814 B1 | 10/2012 | Davis | |
| 8,285,329 B1 | 10/2012 | Zhu | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,332,272 B2 | 12/2012 | Fisher | |
| 8,346,670 B2 | 1/2013 | Hasson | |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,381,307 B2 | 2/2013 | Cimino | |
| 8,391,719 B2 | 3/2013 | Alameh et al. | |
| 8,417,231 B2 | 4/2013 | Sanding et al. | |
| 8,439,271 B2 | 5/2013 | Smets et al. | |
| 8,475,367 B1 | 7/2013 | Yuen et al. | |
| 8,489,112 B2 | 7/2013 | Roeding et al. | |
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Bailey et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | de Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,673,979 B1 * | 6/2017 | Poole | H04L 9/0836 |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,057,227 B1 | 8/2018 | Hess et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |

(56) References Cited

U.S. PATENT DOCUMENTS

| | | | |
|---|---|---|---|
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,321,697 | B1 * | 5/2022 | MacDonald ....... G06Q 20/2295 |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Landau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham, II et al. |
| 2008/0209543 | A1 | 8/2008 | Aaron |
| 2008/0223918 | A1 | 9/2008 | Williams et al. |
| 2008/0285746 | A1 | 11/2008 | Landrock et al. |
| 2008/0308641 | A1 | 12/2008 | Finn |
| 2009/0037275 | A1 | 2/2009 | Pollio |
| 2009/0048026 | A1 | 2/2009 | French |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Ameil et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadarajan |
| 2011/0125638 | A1 | 5/2011 | Davis et al. |
| 2011/0131415 | A1 | 6/2011 | Schneider |
| 2011/0153437 | A1 | 6/2011 | Archer et al. |
| 2011/0153496 | A1 | 6/2011 | Royyuru |
| 2011/0155801 | A1 | 6/2011 | Rowberry |
| 2011/0208658 | A1 | 8/2011 | Makhotin |
| 2011/0208965 | A1 | 8/2011 | Machani |
| 2011/0211219 | A1 | 9/2011 | Bradley et al. |
| 2011/0218911 | A1 | 9/2011 | Spodak |
| 2011/0238564 | A1 | 9/2011 | Lim et al. |
| 2011/0246780 | A1 | 10/2011 | Yeap et al. |
| 2011/0258452 | A1 | 10/2011 | Coulier et al. |
| 2011/0280406 | A1 | 11/2011 | Ma et al. |
| 2011/0282785 | A1 | 11/2011 | Chin |
| 2011/0294418 | A1 | 12/2011 | Chen |

(56) References Cited

U.S. PATENT DOCUMENTS

| | | | |
|---|---|---|---|
| 2011/0312271 | A1 | 12/2011 | Ma et al. |
| 2012/0024947 | A1 | 2/2012 | Naelon |
| 2012/0030047 | A1 | 2/2012 | Fuentes et al. |
| 2012/0030121 | A1 | 2/2012 | Grellier |
| 2012/0047071 | A1 | 2/2012 | Mullen et al. |
| 2012/0079281 | A1 | 3/2012 | Lowenstein et al. |
| 2012/0109735 | A1 | 5/2012 | Krawczewicz et al. |
| 2012/0109764 | A1 | 5/2012 | Martin et al. |
| 2012/0143703 | A1 | 6/2012 | Wall |
| 2012/0143754 | A1 | 6/2012 | Patel |
| 2012/0150737 | A1 | 6/2012 | Rottink et al. |
| 2012/0178366 | A1 | 7/2012 | Levy et al. |
| 2012/0196583 | A1 | 8/2012 | Kindo |
| 2012/0207305 | A1 | 8/2012 | Gallo et al. |
| 2012/0209773 | A1 | 8/2012 | Ranganathan |
| 2012/0238206 | A1 | 9/2012 | Singh et al. |
| 2012/0239560 | A1 | 9/2012 | Pourfallah et al. |
| 2012/0252350 | A1 | 10/2012 | Steinmetz et al. |
| 2012/0254394 | A1 | 10/2012 | Barras |
| 2012/0284194 | A1 | 11/2012 | Liu et al. |
| 2012/0290472 | A1 | 11/2012 | Mullen et al. |
| 2012/0296818 | A1 | 11/2012 | Nuzzi et al. |
| 2012/0316992 | A1 | 12/2012 | Oborne |
| 2012/0317035 | A1 | 12/2012 | Royyuru et al. |
| 2012/0317628 | A1 | 12/2012 | Yeager |
| 2013/0005245 | A1 | 1/2013 | Royston |
| 2013/0008956 | A1 | 1/2013 | Ashfield |
| 2013/0026229 | A1 | 1/2013 | Jarman et al. |
| 2013/0030997 | A1 | 1/2013 | Spodak |
| 2013/0048713 | A1 | 2/2013 | Pan |
| 2013/0054474 | A1 | 2/2013 | Yeager |
| 2013/0065564 | A1 | 3/2013 | Conner et al. |
| 2013/0080228 | A1 | 3/2013 | Fisher |
| 2013/0080229 | A1 | 3/2013 | Fisher |
| 2013/0099587 | A1 | 4/2013 | Lou et al. |
| 2013/0104251 | A1 | 4/2013 | Moore et al. |
| 2013/0106576 | A1 | 5/2013 | Hinman et al. |
| 2013/0119130 | A1 | 5/2013 | Braams |
| 2013/0130614 | A1 | 5/2013 | Busch-Sorensen |
| 2013/0144793 | A1 | 6/2013 | Royston |
| 2013/0146657 | A1 | 6/2013 | Graef |
| 2013/0171929 | A1 | 7/2013 | Adams et al. |
| 2013/0179351 | A1 | 7/2013 | Wallner |
| 2013/0185772 | A1 | 7/2013 | Jaudon et al. |
| 2013/0191279 | A1 | 7/2013 | Calman et al. |
| 2013/0200999 | A1 | 8/2013 | Spodak et al. |
| 2013/0211937 | A1 | 8/2013 | Elbirt |
| 2013/0216108 | A1 | 8/2013 | Hwang et al. |
| 2013/0226791 | A1 | 8/2013 | Springer et al. |
| 2013/0226796 | A1 | 8/2013 | Jiang et al. |
| 2013/0232082 | A1 | 9/2013 | Krawczewicz et al. |
| 2013/0238894 | A1 | 9/2013 | Ferg et al. |
| 2013/0282360 | A1 | 10/2013 | Shimota et al. |
| 2013/0303085 | A1 | 11/2013 | Boucher et al. |
| 2013/0304651 | A1 | 11/2013 | Smith |
| 2013/0311363 | A1 | 11/2013 | Ramaci |
| 2013/0312082 | A1 | 11/2013 | Izu et al. |
| 2013/0314593 | A1 | 11/2013 | Reznik et al. |
| 2013/0344857 | A1 | 12/2013 | Berionne et al. |
| 2014/0002238 | A1 | 1/2014 | Taveau et al. |
| 2014/0019352 | A1 | 1/2014 | Shrivastava |
| 2014/0027506 | A1 | 1/2014 | Heo et al. |
| 2014/0032409 | A1 | 1/2014 | Rosano |
| 2014/0032410 | A1 | 1/2014 | Georgiev et al. |
| 2014/0040120 | A1 | 2/2014 | Cho et al. |
| 2014/0040139 | A1 | 2/2014 | Brudnicki et al. |
| 2014/0040147 | A1 | 2/2014 | Varadarakan et al. |
| 2014/0047235 | A1 | 2/2014 | Lessiak et al. |
| 2014/0067690 | A1 | 3/2014 | Pitroda et al. |
| 2014/0074637 | A1 | 3/2014 | Hammad |
| 2014/0074655 | A1 | 3/2014 | Lim et al. |
| 2014/0081720 | A1 | 3/2014 | Wu |
| 2014/0081785 | A1 | 3/2014 | Valadas Preto |
| 2014/0138435 | A1 | 5/2014 | Khalid |
| 2014/0171034 | A1 | 6/2014 | Aleksin et al. |
| 2014/0171039 | A1 | 6/2014 | Bjontegard |
| 2014/0172700 | A1 | 6/2014 | Teuwen et al. |
| 2014/0180851 | A1 | 6/2014 | Fisher |
| 2014/0208112 | A1 | 7/2014 | McDonald et al. |
| 2014/0214674 | A1 | 7/2014 | Narula |
| 2014/0229375 | A1 | 8/2014 | Zaytzsev et al. |
| 2014/0245391 | A1 | 8/2014 | Adenuga |
| 2014/0256251 | A1 | 9/2014 | Caceres et al. |
| 2014/0258099 | A1 | 9/2014 | Rosano |
| 2014/0258113 | A1 | 9/2014 | Gauthier et al. |
| 2014/0258125 | A1 | 9/2014 | Gerber et al. |
| 2014/0274179 | A1 | 9/2014 | Zhu et al. |
| 2014/0279479 | A1 | 9/2014 | Maniar et al. |
| 2014/0337235 | A1 | 11/2014 | Van Heerden et al. |
| 2014/0339315 | A1 | 11/2014 | Ko |
| 2014/0346860 | A1 | 11/2014 | Aubry et al. |
| 2014/0365377 | A1 | 12/2014 | Salama |
| 2014/0365780 | A1 | 12/2014 | Movassaghi |
| 2014/0379361 | A1 | 12/2014 | Mahadkar et al. |
| 2015/0012444 | A1 | 1/2015 | Brown et al. |
| 2015/0032635 | A1 | 1/2015 | Guise |
| 2015/0071486 | A1 | 3/2015 | Rhoads et al. |
| 2015/0073983 | A1 | 3/2015 | Bartenstein |
| 2015/0088757 | A1 | 3/2015 | Zhou et al. |
| 2015/0089586 | A1 | 3/2015 | Ballesteros |
| 2015/0113271 | A1 | 4/2015 | Jooste |
| 2015/0134452 | A1 | 5/2015 | Williams |
| 2015/0134513 | A1 | 5/2015 | Olson |
| 2015/0140960 | A1 | 5/2015 | Powell et al. |
| 2015/0154595 | A1 | 6/2015 | Collinge et al. |
| 2015/0170138 | A1 | 6/2015 | Rao |
| 2015/0178724 | A1 | 6/2015 | Ngo et al. |
| 2015/0186863 | A1* | 7/2015 | Schwalb .............. G06Q 20/405 705/44 |
| 2015/0186871 | A1 | 7/2015 | Laracey |
| 2015/0199673 | A1 | 7/2015 | Savolainen |
| 2015/0199863 | A1 | 7/2015 | Scoggins |
| 2015/0205379 | A1 | 7/2015 | Mag et al. |
| 2015/0254637 | A1 | 9/2015 | Yang |
| 2015/0302409 | A1 | 10/2015 | Malek et al. |
| 2015/0317295 | A1 | 11/2015 | Sherry |
| 2015/0317626 | A1 | 11/2015 | Ran et al. |
| 2015/0332266 | A1 | 11/2015 | Friedlander et al. |
| 2015/0339474 | A1 | 11/2015 | Paz et al. |
| 2015/0371234 | A1 | 12/2015 | Huang et al. |
| 2016/0012465 | A1 | 1/2016 | Sharp |
| 2016/0026997 | A1 | 1/2016 | Tsui et al. |
| 2016/0048913 | A1 | 2/2016 | Rausaria et al. |
| 2016/0055480 | A1 | 2/2016 | Shah |
| 2016/0057619 | A1 | 2/2016 | Lopez |
| 2016/0065370 | A1 | 3/2016 | Le Saint et al. |
| 2016/0078430 | A1 | 3/2016 | Douglas |
| 2016/0087957 | A1 | 3/2016 | Shah et al. |
| 2016/0092696 | A1 | 3/2016 | Guglani et al. |
| 2016/0148193 | A1 | 5/2016 | Kelley et al. |
| 2016/0189143 | A1 | 6/2016 | Koeppel |
| 2016/0232523 | A1 | 8/2016 | Venot et al. |
| 2016/0239672 | A1 | 8/2016 | Khan et al. |
| 2016/0239842 | A1* | 8/2016 | Cash .................. G06Q 20/3821 |
| 2016/0253651 | A1 | 9/2016 | Park et al. |
| 2016/0255072 | A1 | 9/2016 | Liu |
| 2016/0267486 | A1 | 9/2016 | Mitra et al. |
| 2016/0277383 | A1 | 9/2016 | Guyomarc'h et al. |
| 2016/0277388 | A1 | 9/2016 | Lowe et al. |
| 2016/0307187 | A1 | 10/2016 | Guo et al. |
| 2016/0307189 | A1 | 10/2016 | Zarakas et al. |
| 2016/0314472 | A1 | 10/2016 | Ashfield |
| 2016/0330027 | A1 | 11/2016 | Ebrahimi |
| 2016/0335531 | A1 | 11/2016 | Mullen et al. |
| 2016/0379217 | A1 | 12/2016 | Hammad |
| 2017/0004502 | A1 | 1/2017 | Quentin et al. |
| 2017/0011395 | A1 | 1/2017 | Pillai et al. |
| 2017/0011406 | A1 | 1/2017 | Tunnell et al. |
| 2017/0017957 | A1 | 1/2017 | Radu |
| 2017/0017964 | A1 | 1/2017 | Janefalkar et al. |
| 2017/0024716 | A1 | 1/2017 | Jiam et al. |
| 2017/0034168 | A1* | 2/2017 | Wilson ................ H04L 63/0807 |
| 2017/0039566 | A1 | 2/2017 | Schipperheijn |
| 2017/0041759 | A1 | 2/2017 | Gantert et al. |

(56) References Cited

U.S. PATENT DOCUMENTS

| | | | |
|---|---|---|---|
| 2017/0068950 | A1 | 3/2017 | Kwon |
| 2017/0103388 | A1 | 4/2017 | Pillai et al. |
| 2017/0104739 | A1 | 4/2017 | Lansler et al. |
| 2017/0109509 | A1 | 4/2017 | Baghdasaryan |
| 2017/0109730 | A1 | 4/2017 | Locke et al. |
| 2017/0116447 | A1 | 4/2017 | Cimino et al. |
| 2017/0124568 | A1 | 5/2017 | Moghadam |
| 2017/0140379 | A1 | 5/2017 | Deck |
| 2017/0154328 | A1 | 6/2017 | Zarakas et al. |
| 2017/0154333 | A1 | 6/2017 | Gleeson et al. |
| 2017/0180134 | A1 | 6/2017 | King |
| 2017/0230189 | A1 | 8/2017 | Toll et al. |
| 2017/0237301 | A1 | 8/2017 | Elad et al. |
| 2017/0289127 | A1 | 10/2017 | Hendrick |
| 2017/0295013 | A1 | 10/2017 | Claes |
| 2017/0316696 | A1 | 11/2017 | Bartel |
| 2017/0317834 | A1 | 11/2017 | Smith et al. |
| 2017/0330173 | A1 | 11/2017 | Woo et al. |
| 2017/0374070 | A1 | 12/2017 | Shah et al. |
| 2018/0034507 | A1 | 2/2018 | Wobak et al. |
| 2018/0039986 | A1 | 2/2018 | Essebag et al. |
| 2018/0039987 | A1 | 2/2018 | Molino |
| 2018/0068316 | A1 | 3/2018 | Essebag et al. |
| 2018/0129945 | A1 | 5/2018 | Saxena et al. |
| 2018/0160255 | A1 | 6/2018 | Park |
| 2018/0191501 | A1 | 7/2018 | Lindemann |
| 2018/0205712 | A1 | 7/2018 | Versteeg et al. |
| 2018/0240106 | A1 | 8/2018 | Garrett et al. |
| 2018/0254909 | A1 | 9/2018 | Hancock |
| 2018/0268132 | A1 | 9/2018 | Buer et al. |
| 2018/0270214 | A1 | 9/2018 | Caterino et al. |
| 2018/0294959 | A1 | 10/2018 | Traynor et al. |
| 2018/0300716 | A1 | 10/2018 | Carlson |
| 2018/0302396 | A1 | 10/2018 | Camenisch et al. |
| 2018/0315050 | A1 | 11/2018 | Hammad |
| 2018/0316666 | A1 | 11/2018 | Koved et al. |
| 2018/0322486 | A1 | 11/2018 | Deliwala et al. |
| 2018/0359100 | A1 | 12/2018 | Gaddam et al. |
| 2019/0014107 | A1 | 1/2019 | George |
| 2019/0019375 | A1 | 1/2019 | Foley |
| 2019/0036678 | A1 | 1/2019 | Ahmed |
| 2019/0172055 | A1 | 6/2019 | Hale |
| 2019/0228406 | A1* | 7/2019 | Patel ........................ G06F 21/45 |
| 2019/0238517 | A1 | 8/2019 | D'Agostino et al. |
| 2019/0303945 | A1 | 10/2019 | Mitra |
| 2020/0104841 | A1* | 4/2020 | Osborn ................ G06Q 20/343 |
| 2021/0004806 | A1 | 1/2021 | Noe |
| 2021/0044976 | A1* | 2/2021 | Avetisov ............... H04W 12/08 |
| 2021/0067496 | A1 | 3/2021 | Madisetti et al. |
| 2021/0075603 | A1* | 3/2021 | Hennebert ............ H04L 9/0618 |
| 2021/0174352 | A1* | 6/2021 | Kenney .............. G06Q 20/3224 |
| 2021/0192037 | A1* | 6/2021 | Ehrensvärd ......... H04L 63/0876 |
| 2021/0194703 | A1* | 6/2021 | Queralt ............... H04L 63/0815 |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0366411 | A1* | 11/2022 | Bajwa .................. G06Q 20/229 |
| 2022/0398566 | A1 | 12/2022 | Rule |
| 2022/0407859 | A1* | 12/2022 | Upadhyay ............... G06F 21/31 |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0091318 | A1* | 3/2023 | Lindemann ......... H04L 63/0861 726/4 |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| CN | 103023643 | A | 4/2013 |
| CN | 103417202 | A | 12/2013 |
| EP | 1085424 | A1 | 3/2001 |
| EP | 1223565 | A1 | 7/2002 |
| EP | 1265186 | A2 | 12/2002 |
| EP | 1783919 | A1 | 5/2007 |
| EP | 2139196 | A1 | 12/2009 |
| EP | 1469419 | A1 | 8/2012 |
| EP | 2852070 | A1 | 3/2015 |
| GB | 2457221 | A | 8/2009 |
| GB | 2516861 | A | 2/2015 |
| GB | 2551907 | A | 1/2018 |
| KR | 101508320 | B1 | 4/2015 |
| KR | 20150140132 | A | 12/2015 |
| NO | 2008055170 | A2 | 5/2008 |
| WO | 9910824 | A1 | 3/1999 |
| WO | 0049586 | A1 | 8/2000 |
| WO | 2006070189 | A2 | 7/2006 |
| WO | 2009025605 | A2 | 2/2009 |
| WO | 2010049252 | A1 | 5/2010 |
| WO | 2011112158 | A1 | 9/2011 |
| WO | 2012001624 | A1 | 1/2012 |
| WO | 2013039395 | A1 | 3/2013 |
| WO | 2013155562 | A1 | 10/2013 |
| WO | 2013192358 | A2 | 12/2013 |
| WO | 2014043278 | A1 | 3/2014 |
| WO | 2014170741 | A2 | 10/2014 |
| WO | 2015179649 | A1 | 11/2015 |
| WO | 2015183818 | A1 | 12/2015 |
| WO | 2016097718 | A1 | 6/2016 |
| WO | 2016160816 | A1 | 10/2016 |
| WO | 2016168394 | A1 | 10/2016 |
| WO | 2017042375 | A1 | 3/2017 |
| WO | 2017042400 | A1 | 3/2017 |
| WO | 2017047855 | A1 | 3/2017 |
| WO | 2017157859 | A1 | 9/2017 |
| WO | 2017208063 | A1 | 12/2017 |
| WO | 2018063809 | A1 | 4/2018 |
| WO | 2018137888 | A1 | 8/2018 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

(56) References Cited

OTHER PUBLICATIONS

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application, International Journal of Advanced Computer Science and Applications," 4(8):173-181 (2013).
Author unknown, "EMV Card Personalization Specification", EMVCo., LLC., specification version 1.0, (2003) 81 pages.
Ullmann et al., "On-Card User Authentication for Contactless Smart Cards based on Gesture Recognition", paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.

(56) References Cited

OTHER PUBLICATIONS

Smart Card Alliance, "Co-Branded Multi-Application Contactless Cards for Transit and Financial Payment," A Smart Card Alliance Transportation Council White Paper (40 pages), Mar. 2008.

* cited by examiner

300

MULTI-MODAL ACCESS TO AN ONLINE SERVICE USING HIERARCHICAL CRYPTOGRAPHIC KEYS FOR USER AUTHENTICATION OF ACCOUNTS AND SUBACCOUNTS

BACKGROUND

One problem encountered with business organizations is how to enable employees to pay for items that employees need to purchase for their work. One solution conventionally used is to issue a credit card to a manager of the business organization. When an employee that the manager manages needs to make a work-related purchase, the employee request the manager to use the credit card to make the purchase or requests to borrow the credit card to make the purchase. One problem with this approach is that the manager may not be available to provide the credit card when it is used. In addition, some employees may make unapproved purchases when lent the credit card. Another complication is that the billing statement for the credit card does not indicate who made each purchase; rather the statement just contains a list of purchases sorted by date.

Another option is to issue each employee a credit card. One difficulty with this option is that some employees may make purchases without getting managerial approval. Further, some employees may use the credit card for personal purchases. Some employees may also spend too much on items. In addition, some employees may lose their credit cards or increase the risk of credit card fraud by not following proper security precautions.

These problems have become more pronounced with many credit card purchases being made online. The credit card holder merely needs to access a website and provide the credit card number online to make a purchase. The employee just needs to know the credit card number, expiration date and security code to make purchases.

SUMMARY

In accordance with an inventive aspect, a method is performed by a processor of a computing device. Per the method, with the processor, a primary cryptographic key pair is registered with an account of an online service for user authentication when accessing an online service. The primary cryptographic key pair includes a primary private cryptographic key and a primary public cryptographic key. A secondary cryptographic key pair is derived with the processor from the primary private cryptographic key. The secondary cryptographic key pair is for user authentication when accessing the online service and includes a private secondary cryptographic key and a public secondary cryptographic key. The secondary cryptographic key pair is registered by the processor with a subaccount of the account for the online service. The primary private cryptographic key is registered with the account. With the processor, the secondary private cryptographic key is designated for a mode of access to the online service that is more limited than the mode of access designated for the primary private cryptographic key, and the secondary private cryptographic key is forwarded to a client computing device.

The online service may be a website, and the secondary private cryptographic key may enable access to only a portion of the website, whereas the primary cryptographic key enables access to the full website. The online service may enable a user to purchase goods or services, and the mode of access for the subaccount may limit purchase of items by the user to a subset of less than all of the goods or services that may be purchased via the online service. The method may further include associating a payment mechanism with the account such that goods or services purchased via the online service using the account are paid via the associated payment mechanism. The associated payment mechanism may be one of a credit card account, a debit card account, an online payment account, a bank account a peer-to-peer payment or a cryptocurrency account. The method may further include creating a virtual account payment mechanism from the payment mechanism associated with the account. The virtual account payment mechanism may have an associated identifier and the virtual payment account mechanism may be associated with the subaccount such that good or services purchased via the online service via the subaccount are paid via virtual payment account payment mechanism using the associated identifier. The payment mechanism associated with the account may be a credit card having a credit card number, and the virtual payment account mechanism may be a virtual credit card having a virtual credit card number as the associated identifier.

In accordance with another inventive aspect, a method is performed by a processor of a computing device. The method entails, with the processor, registering a primary cryptographic key pair with an account of an online service for user authentication when accessing an online service. The primary cryptographic key pair includes a primary private cryptographic key and a primary public cryptographic key. With the processor, secondary cryptographic key pairs are derived from the primary private cryptographic key. The secondary cryptographic key pairs are for user authentication when accessing the online service, and each of the secondary cryptographic key pairs includes a public secondary cryptographic key and a private secondary cryptographic key. With the processor, registering at least some of the secondary cryptographic key pairs with respective subaccounts of the account for the online service, wherein the primary private cryptographic key is registered with the account. With the processor, each of the secondary private cryptographic keys of the registered secondary cryptographic key pairs are designated for a respective mode of access to the online service that is more limited than the mode of access designated for the primary private cryptographic key and the registered secondary private cryptographic keys is forwarded to a client computing device.

The method may further include registering a primary payment mechanism with the account for paying for good or services when accessing the online service via the account and deriving virtual payment mechanisms for the subaccounts from the primary payment mechanism that are associated with the primary payment mechanism and registering respective ones of the virtual payment mechanisms with respective ones of the registered subaccounts for payment for goods or services when accessing the online service via the respective subaccounts. The online service may be a website, and a user accessing the website via first of the registered subaccounts may access only a first portion of the website whereas the user accessing the website via a second of the registered subaccounts may access only a second portion of the website that differs at least in part from the first portion. A first of the registered subaccounts may have a first spending limit specifying how much a user may spend when accessing the online service via the first of the registered subaccounts. A second of the registered subaccounts may have a second spending limit that differs from the first spending limit. The method may include deriving a tertiary cryptographic key pair for user authentication for the online service for a child account of one of the subaccounts from one of the secondary cryptographic key pairs.

In accordance with an additional inventive aspect, a method is performed by a processor of a computing device. The method entails receiving a request from a requestor to access an online service via a subaccount of an account of the online service, and based on the receiving of the request, with the processor, issuing a cryptographic challenge to the requestor. The method further includes receiving a response to the challenge, and with the processor, determining if the response was proper by determining if the response was generated using a secondary private cryptographic key that is registered for the subaccount. Where the processor determines that the response was proper, the requestor is granted access to online service via the subaccount in accordance with a mode of access permitted for the subaccount. Where the processor determines that the response was improper, access to the online service via the subaccount is denied.

The mode of access permitted for the subaccount may specify what portions of the online service are accessible. The mode of access permitted for the subaccount may specify what interactions with the online service are permitted. The mode of access permitted for the subaccount may specify what good or services may be purchased via the online service using the subaccount. The mode of access permitted for the subaccount may specify a spending limit for good or services purchased via the online service using the subaccount. A payment mechanism may be associated with the subaccount for payment of goods or services purchased via the online service using the subaccount.

DETAILED DESCRIPTION

Figure 1:
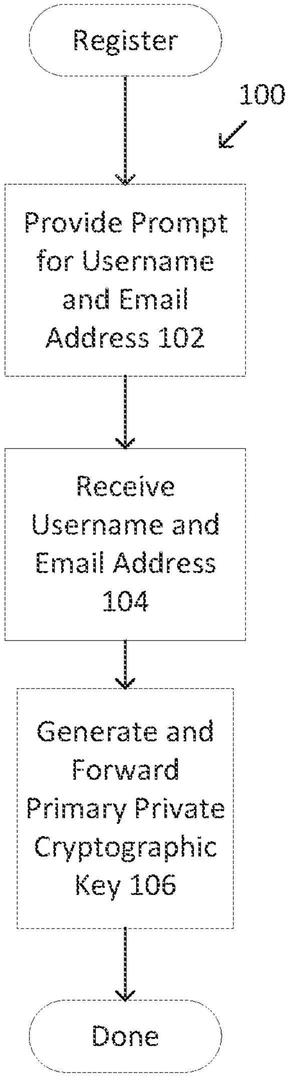
FIG. 1 depicts a flowchart of illustrative steps that may be performed in exemplary embodiments to register for an account with an online service.

The exemplary embodiments may provide a passwordless user authentication mechanism that enables users to be authenticated for accessing an online service. The online service may be, for example, a website that provides a service. More generally, an online service is a service that may be accessed via a computing device over a network connection. The exemplary embodiments use cryptographic key pairs as part of the credentials for user authentication. A user registers an account with the online service and then is given a private cryptographic key that is used to gain access to the online service. A public cryptographic key is also generated for the account (which may be referred to as a "primary account"), which is used by the online service in authenticating the user. The exemplary embodiments enable the creation of subaccounts that are affiliated with the primary account. At least one offspring cryptographic key pair (also referred to as "secondary key pair") for user authentication may be generated for each subaccount. The offspring cryptographic key pairs are derived from the primary cryptographic key pair for user authentication that is associated with the primary account. The offspring cryptographic key pairs are used to gain access to the online service via a subaccount.

When a user wishes to gain access to the online service via a subaccount, the user may provide a username. The online service has an authenticator that generates a cryptographic challenge for the user based upon the public cryptography key associated with the user and the subaccount. The user generates a response to the cryptographic challenge. The authenticator for the online service determines whether the response was proper or not. If the response was proper, the user is given access to the online service via the subaccount.

Each subaccount may have different modes of access. In other words, each subaccount may have different authorizations relative to use of the online service. For example, a first subaccount may have access to an entire website of the online service, whereas a second subaccount may only access a portion of the website of the online service. As an example, an administrative assistant with an organization may only access a portion of a purchasing website relating to office supplies. In addition, the mode of access may limit what actions a user may take relative to the online service. For instance, a user may be limited in what purchases of goods and services a user may realize through the online service. Similarly, a user may be limited in the amount that the user may spend in making purchases via the online service.

Each subaccount may have an associated virtual payment mechanism (e.g., a virtual account number) that is associated with the payment mechanism for the account. The virtual payment mechanism may have a virtual identifier that is derived from the identifier for the payment mechanism the account. For example, if a credit card is associated with the account for making payments, a derived virtual credit card number may be associated with the subaccount and use to make purchases. The online service knows that the charges are to be levied relative to the credit card for the account but associates the charges with the subaccount. When a statement of account is produced by the online service, the statement of account may detail purchases by subaccount.

The exemplary embodiments thus address some of the concerns detailed above with the conventional approach of lending a credit card to members of an organization or providing each member of an organization with a separate credit card. Limitations can be placed on the mode of access for each subaccount. Limitation such as spending limits and restrictions on what items may be purchased help to address some of the concerns found conventionally. Moreover, purchases may be reported by subaccount and thus, the responsible parties may be identified for the purchases. Still further, the login is secured and lost keys may be easily replaced.

In some embodiments, permissions, access, and/or authorizations for subaccounts and sub-pairs of cryptographic keys may be modified by the primary account. For example, a manager may grant additional privileges to a subaccount associated with an employee who reaches a predetermined tenure (e.g., 3 years, 5 years, etc.) and/or remove privileges for another employee on a performance plan. Furthermore, any granted permissions may be based on predetermined periods of time, predetermined dollar amounts, and/or a predetermined number of purchases (e.g., each new employee may receive a subaccount with a $100 allowance for office supplies that expires 30 days after the employee's date of hire). In some embodiments, multiple different key pairs may be assigned to a subaccount (e.g., to give multiple people shared access to the same pool of privileges, budget, etc. with the ability to manage and/or terminate access individually, e.g., after an employee leaves an organization).

Further still, subaccounts and/or tertiary accounts may be used to provide a similar set of privileges (e.g., a subaccount and any tertiary accounts thereof may have the same set of restrictions and/or rules), but using different tertiary accounts provides additional transparency into which individual made a given purchase. Doing so allows individual users (e.g., tertiary accounts) to be added and/or removed from a subaccount as needed. Furthermore, doing so may subject all purchases made by the tertiary accounts to the budget restrictions or any other restrictions that apply to the subaccount.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 121 illustrated as components 121-1 through **121-*a* may include components 121-1, 121-2, 121-3, 121-4, and 121-5**. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

In the exemplary embodiments, a user may be required to register with an online service before the user is permitted to access the online service. The registration may create an account that is associated with the user and that may be used to access the online service. FIG. 1 depicts a flowchart 100 of illustrative steps that may be performed in exemplary embodiments to register a user for an account with an online service. Initially, at 102, the user may access the online service such as via a web browser or application and may be provided with a prompt to enter a username and email address. The username uniquely identifies the user in accessing the online service. The email address may be used to contact the user, such as in issuing a cryptographic challenge or to provide the user with information. The user may provide the username and email address in response to the prompt so that the username and email address are received by the online service at 104. At 106, the online service generates a pair of primary cryptographic user authentication keys that include a primary private user authentication cryptographic key and a primary public user authentication cryptographic key. The primary private cryptographic key is forwarded to the user. The user may use the primary private cryptographic key to gain access to the online service via the account. Known cryptographic techniques may be used for generating the keys. In some embodiments, an entity separate from the online service may generate the keys. For example, a third-party key generation service may generate the key pairs and provide both keys to the requesting user. The requesting user may then provide/register the public key with the online service along with the username, email, etc. for the account, and same for any sub-accounts and secondary key pairs.

Figure 2:
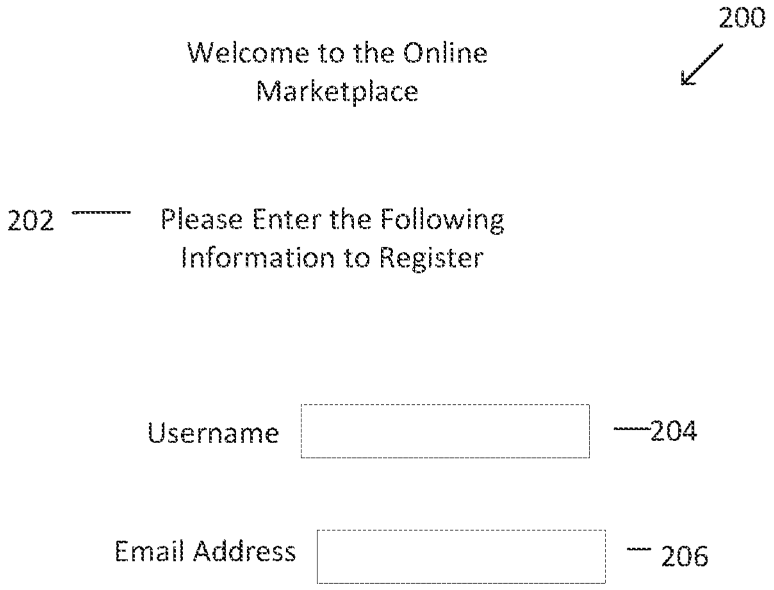
FIG. 2 depicts an illustrative prompt that may be displayed for user to enter information to register for an account with an online service.

FIG. 2 shows an example of a prompt 200 that may be used in an exemplary embodiment to obtain the information needed to register the user for an account, such as described above relative to step 102. The prompt 200 may include text 202 to get the user to enter information to register. A text box 204 for a user to enter a username and a text box 206 for the user to enter an email address are provided. It should be appreciated that other user interfaces may be used to solicit such information.

Figure 3:
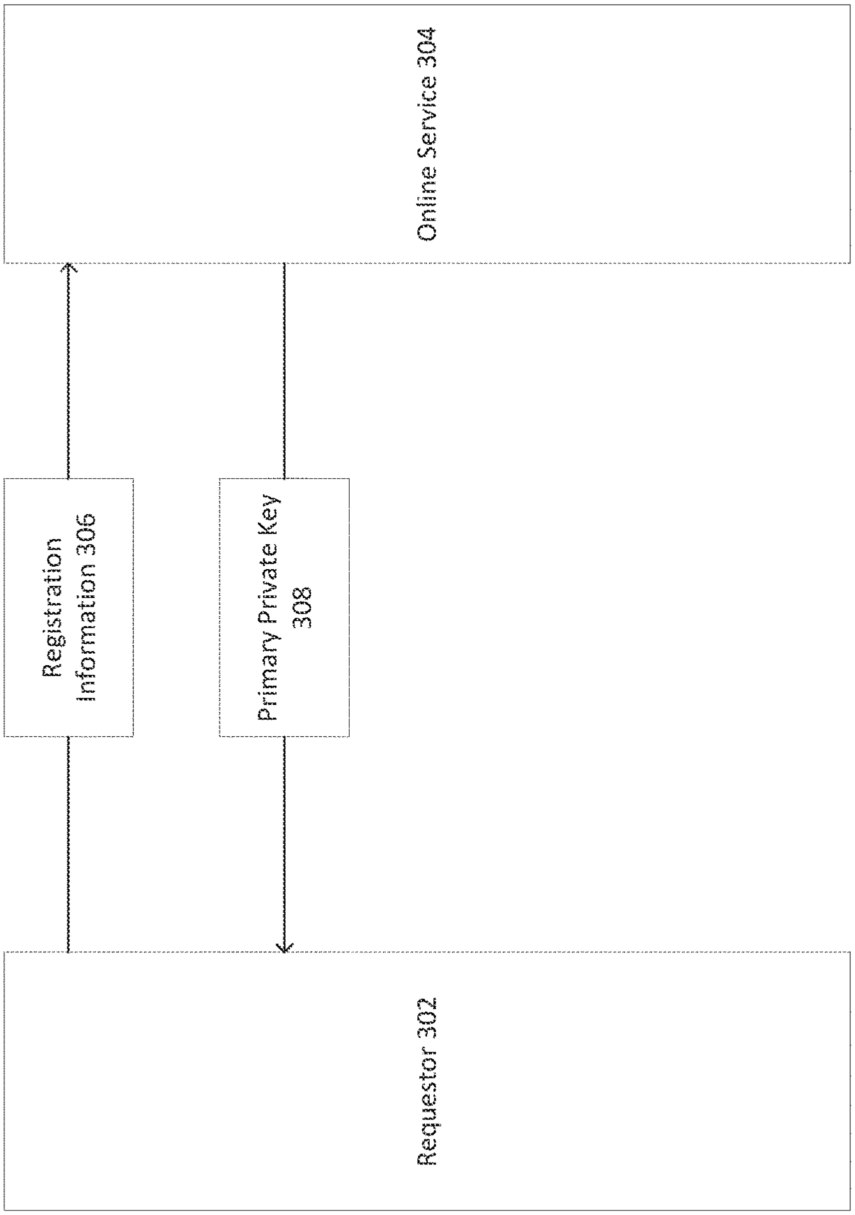
FIG. 3 depicts the flow of information between a requester and an online service in a user registering for an account with the online service in exemplary embodiments.

FIG. 3 depicts a diagram 300 of the exchange that may take place for the user to register in exemplary embodiments. In this depiction, the user or a client computing device is the requester 302. The requester 302 submits registration information 306, such as a username and email address, to the online service 304. In response, the online service returns a primary private cryptographic key 308 for the account. The requester 302 securely stores the primary private cryptographic key 308 for future use.

Once the user has obtained a primary private cryptographic key for an account, the user may wish to generate subaccounts and obtained offspring cryptographic key pairs for the subaccounts. For example, suppose that a manager of a corporation opens an account with an online marketplace and wishes to provide access to the online marketplace to a number of the employees that are under his/her management. One way to facilitate such access in the exemplary embodiments is to generate subaccounts and associate offspring cryptographic key pairs with the subaccounts. The offspring cryptographic key pairs may be generated from the public cryptographic key for the account. The offspring cryptographic key pairs may be used to perform user authentication for the subaccounts as will be detailed below.

Figure 4:
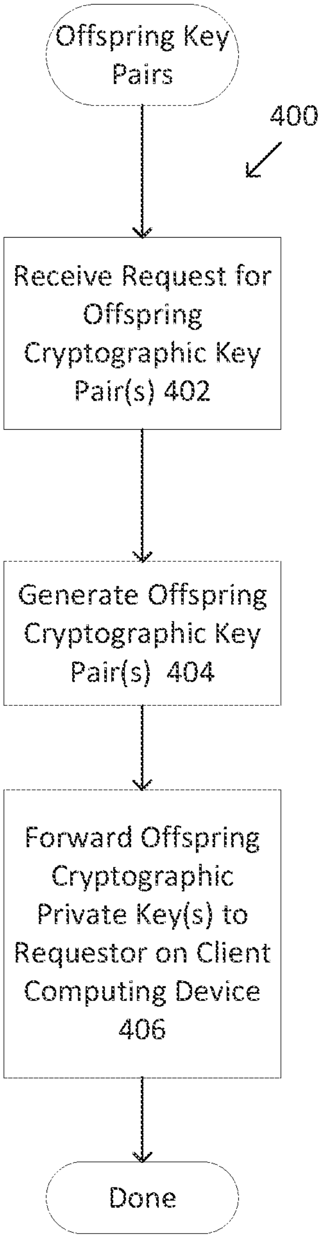
FIG. 4 depicts a flowchart of illustrative steps that may be performed in exemplary embodiments in generating offspring cryptographic key pair(s).

FIG. 4 depicts a flowchart 400 of illustrative steps that may be performed to generate such offspring key pairs. At 402, the online service receives a request for the generation of offspring cryptographic key pair(s). For example, the manager mentioned in the above example may wish to generate offspring key pairs for the subaccounts. Hence the manager may submit a request to the online service. The manager may request a single offspring cryptographic key pair for a single subaccount or multiple offspring cryptographic key pairs for multiple subaccounts. Each subaccount has an associated offspring cryptographic key pair. At 404, the online service generates offspring cryptographic key pair(s). A number of different approaches may be used to derive such offspring cryptographic key pairs from the primary cryptographic key pair. The key derivation approach used in EMV key management may be used, for example. At 406, the offspring cryptographic key pair is forwarded to the requester. Thus, the requester is in possession of the private cryptographic key(s) that is/are generated in response to the request.

Figure 5:
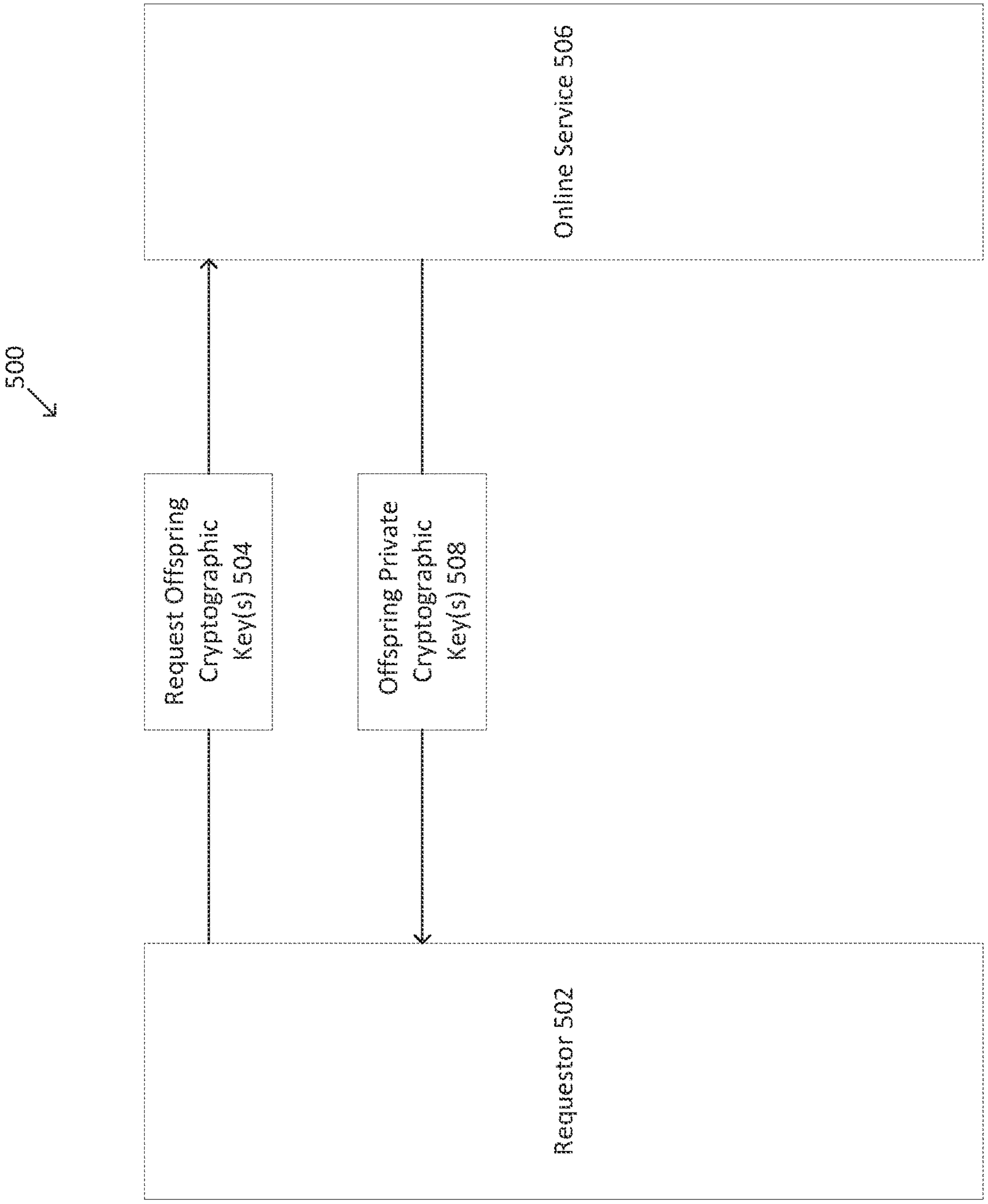
FIG. 5 depicts the flow of information between a requester and an online service in providing the requester with private offspring key(s) in exemplary embodiments.

FIG. 5 depicts a diagram 500 showing the interaction between the requester 502 and the online service 506 when such a request for offspring cryptographic key(s) is submitted. The online service 506 forwards the offspring private cryptographic key(s) to the requester 502 as discussed above.

Figure 6:
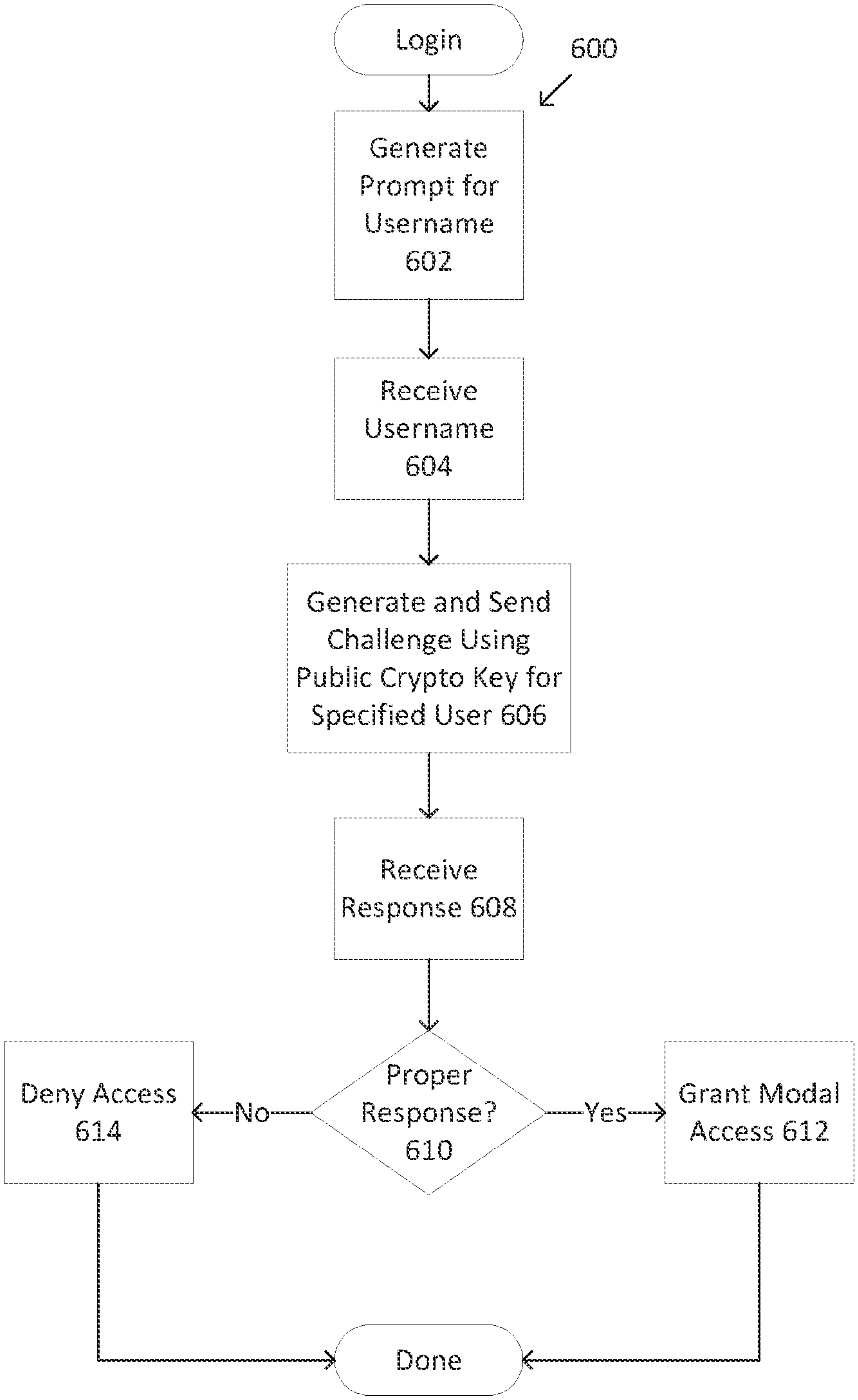
FIG. 6 depicts a flowchart of illustrative steps that may be performed in exemplary embodiments in logging into a subaccount of the online service using a private cryptographic key.
Figure 7:
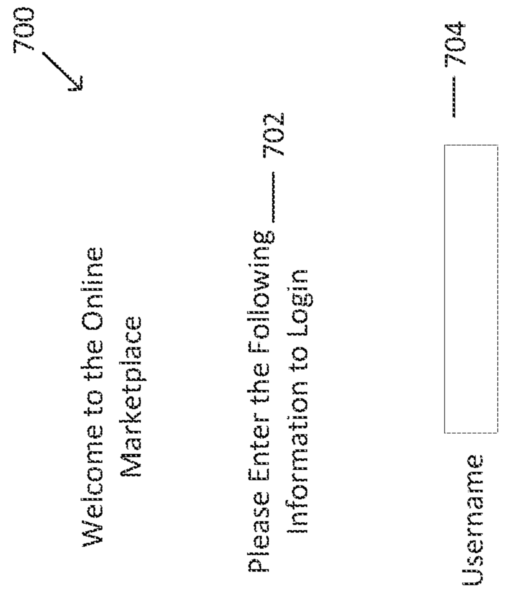
FIG. 7 depicts an example of a prompt that is provided during login to the online service to obtain a username from a user in an exemplary embodiment.
Figure 8:
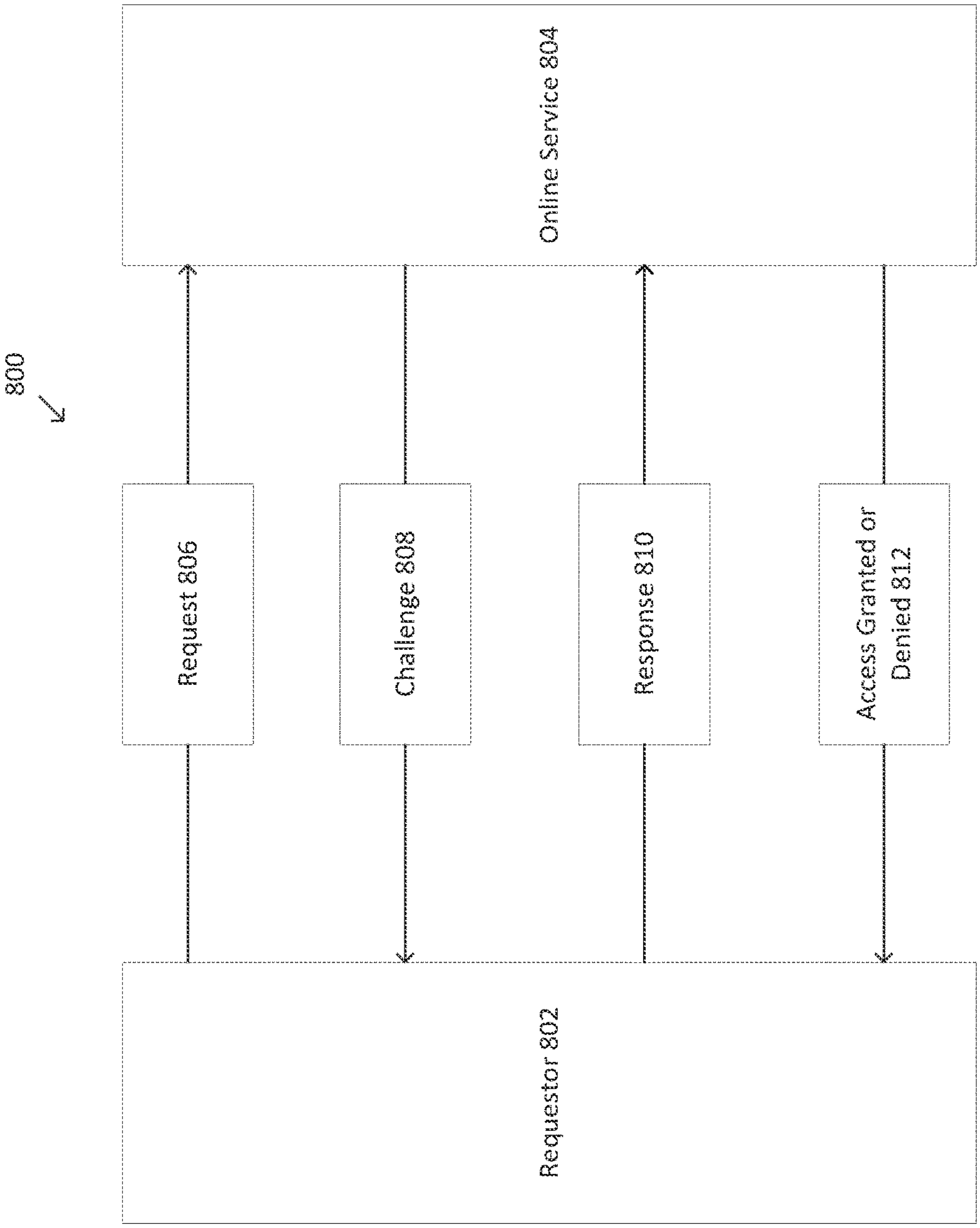
FIG. 8 depicts the flow of information between a requester an online service during the login process in exemplary embodiments.

Once the users are in possession of the offspring private cryptographic keys for subaccounts, the users may wish to login to the online service using the subaccounts. FIG. 6 depicts a flowchart of illustrative steps that may be performed in exemplary embodiments to login to such subaccounts. At 602, the online service may generate a prompt for the user to enter a username. FIG. 7 depicts an illustrative prompt 700. The prompt includes text 702 instructing the user to enter their username. A text box 704 is provided for the user to enter the username. At 604, the online service receives the username that has been entered in response to the prompt. FIG. 8 depicts a diagram 800 illustrating the flow of information between a requester 802 and the online service 804. Initially, the requester (e.g., user) makes a request 806 to login by providing the username in response to the prompt 700. With reference to FIG. 6 again, at 604, the username is received by the online service 804. At 606, the online service 804 generates a cryptographic challenge using the public cryptographic key for the user associated with the username and subaccount. That generation of the challenge may be performed using known techniques for generating a cryptographic challenge. For example, the techniques used in the FIDO2 standard may be employed. The challenge 808 is sent from the online service 804 to the requester 802. The requester 802 generates a response 810 that is received by the online service 804 at 608. The online service 804, at 610, determines whether the response is proper or not. If the response is proper, at 612, the user is granted modal access to the online service per the mode of access permitted for the subaccount. If the response is not proper, at 614, access to the online service via the subaccount is denied. As shown in FIG. 8, the communication indicating that access is granted or denied 812 is sent from the online service 804 to the requester 802.

Figure 9:
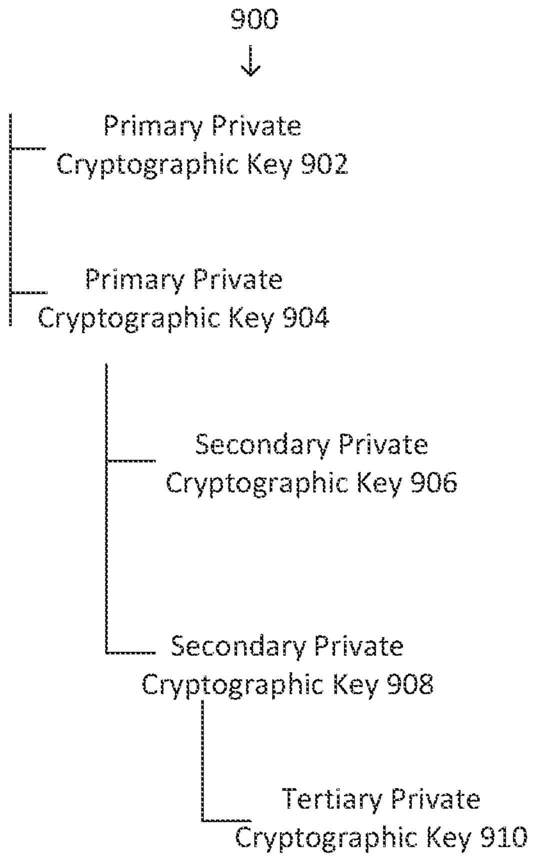
FIG. 9 depicts an illustrative hierarchy of private cryptographic keys including secondary private cryptographic keys and a tertiary private cryptographic key.

As was mentioned above, a hierarchy of cryptographic key pairs may be generated for hierarchically organized subaccounts. FIG. 9 depicts an illustrative hierarchy 900. In the hierarchy 900 depicted in FIG. 9, there are two primary private cryptographic keys 902 and 904. Two secondary private cryptographic keys 906 and 908 have been derived from the primary private cryptographic key 904. In addition, a tertiary private cryptographic key 910 has been derived from the secondary private cryptographic key 908. The tertiary private cryptographic key 910 may be appropriate when there is a subaccount of a subaccount. It should be appreciated that this depiction of the hierarchy is intended to be merely illustrative and not limiting. Other hierarchical organizations of subaccounts and private cryptographic keys may be deployed in the exemplary embodiments.

Figure 10:
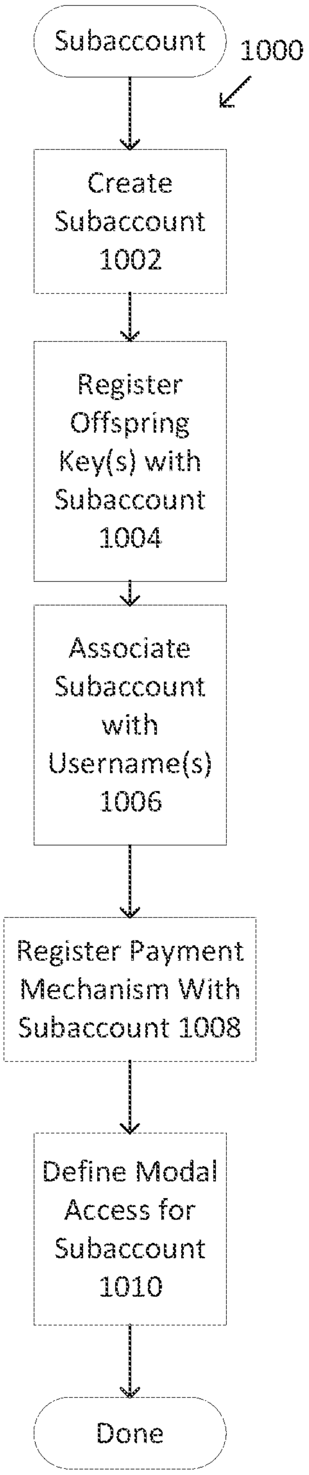
FIG. 10 depicts a flowchart of illustrative steps that may be performed in exemplary embodiments relative to a subaccount to properly configure the subaccount.

FIG. 10 depicts a flowchart 1000 of illustrative steps that may be performed in exemplary embodiments in configuring a subaccount. Initially, at 1002, the subaccount is created by the online service. Data structures and other records may be created to store information regarding the subaccount. Alternatively, a subaccount object may be instantiated. At 1004, offspring key(s) may be registered with the subaccount. In many cases only a single offspring key will be associated with the subaccount. However, it may be possible that multiple offspring keys may be associated with the subaccount. At 1006, the subaccount is associated with the username(s) that have access to the subaccount. This registration identifies what users have access to a subaccount. At 1008, the payment mechanism for the subaccount is registered with subaccount. As was discussed above, a virtual payment account identifier may be associated with the subaccount and used in making purchases of goods or services via the online service. As was mentioned above, the virtual payment account identifier may be derived from the payment account identifier for the account with which the subaccount is associated. At 1010, the modal access for the subaccount is defined. The modal access may be defined by specifying rights or limitations on the user's access to and use of the online service. As was mentioned above, the user may be limited what portion of the online service user's access to and may be limited in purchases both in what may be purchased and in how much may be purchased. Other modal restrictions and rights may also be specified.

Figure 11:
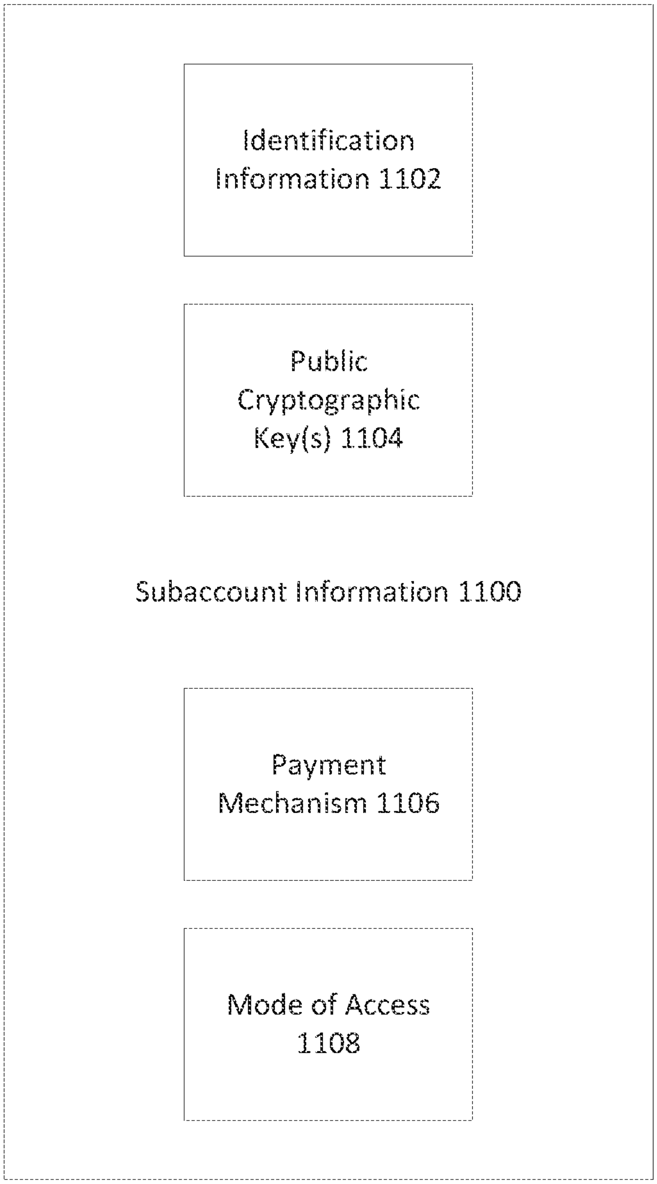
FIG. 11 depicts a block diagram of subaccount information that may be stored for a subaccount for the online service in exemplary embodiments.

FIG. 11 depicts an illustration of subaccount information 1100 that may be stored by the online service for a subaccount and used as needed. The subaccount information 1100 may include identification information 1102. The identification information 1102 may include, for example, an identifier for the subaccount, such as a subaccount number. In addition, the identification information 1102 may store a list of the usernames for users that have access to the subaccount. The subaccount information 1100 may also store the public cryptographic key(s) that is/are associated with the subaccount. The subaccount information 1100 may specify the payment mechanism 1106 that is associated with the subaccount. The subaccount information 1100 may further specify the modal access 1108 for the subaccount. The modal of access information 1108 may specify the rights and limitations of access to the online service associated with a subaccount.

Figure 12:
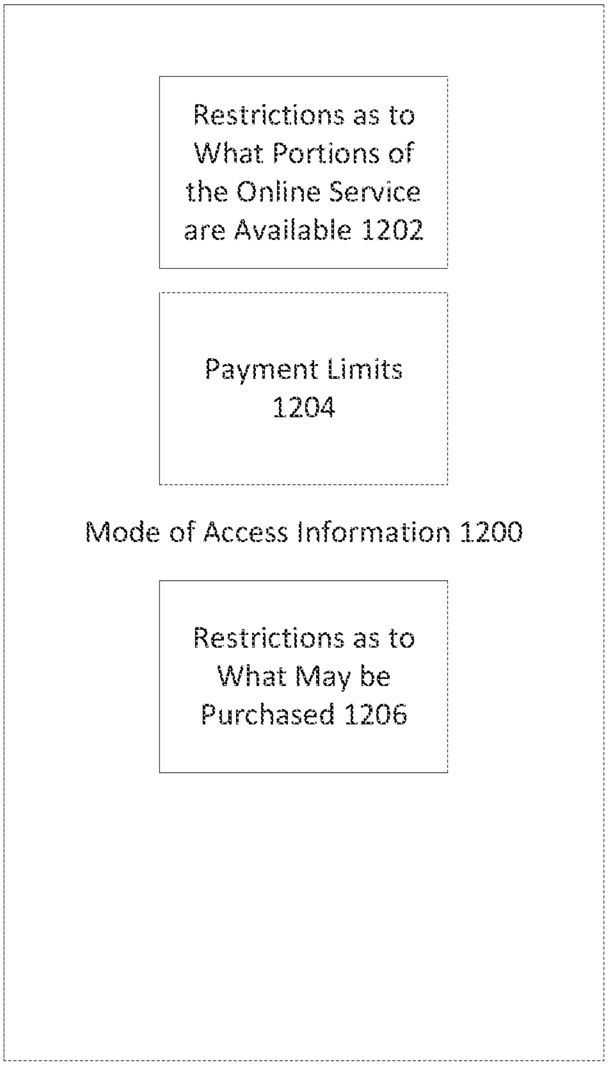
FIG. 12 depicts a block diagram of motive access information that may be stored for a subaccount for the online service in exemplary embodiments.

FIG. 12 depicts a diagram showing example of what may be held in the mode of access information 1200. The mode of access information 1200 may include a specification of the restrictions as to what portions of the online service are available to the user 1202. For instance, if the online service is a website, the specification restrictions may specify what portions of the website are accessible to the user and/or what functionality is available to the user via the website. The mode of access information 1200 may also specify payment limits 1204. The payment limits may specify a maximum of the user is allowed to spend over a time window or in any purchase. The mode of access information 1200 may also specify restrictions as to what may be purchased 1206. It should be appreciated that other restrictions and rights may be specified in the motive access information 1200. The mode of access information 1200 may specify a privilege level. The mode of access information 1200 may specify access control information, such as traditionally found in access control lists. The information in the mode of access information 1200 is used by the online service to determine what a user is authorized to do relative to the online service. The mode of access information 1200 may further specify the ability to make changes to the account (e.g., the ability to manage subaccounts, modify profile information such as email addresses, user names, shipping addresses, billing addresses, payment methods, notification settings, contact information, payment methods, and/or payment terms, and the ability to see past purchases and/or billing reports. Further still, the mode of access information 1200 may specify restrictions on delivery methods (e.g., ground shipments only vs. overnight or Saturday delivery service), restrictions on ship-to locations (e.g., only able to ship to the local office vs. all offices, or only able to ship to existing ship-to addresses), restrictions on purchase frequency, restrictions on basket value, monthly spending limits, etc. Any spending limits may be applied to the payment method subaccounts and/or the online account/subaccounts.

Figure 13:
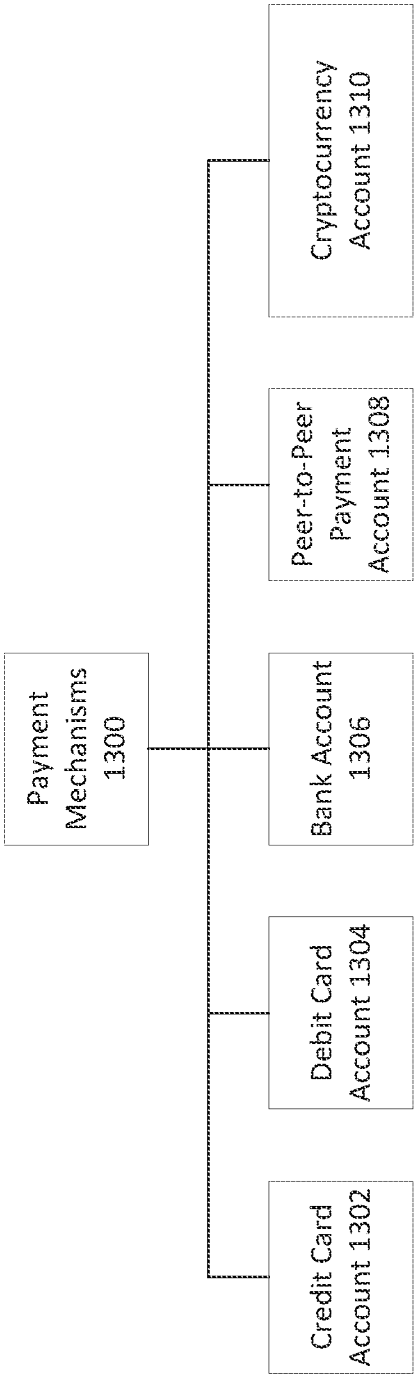
FIG. 13 depicts different types of payment mechanisms that may be associated with accounts and/or subaccounts in exemplary embodiments.

Different payment mechanisms 1300 may be associated with accounts and subaccounts. As shown in FIG. 13 the payment mechanisms 1300 may include a credit card account 1302. The credit card associated with a credit card account may be charged for purchases made via the account or subaccount. The payment mechanism 1300 may be a debit card account 1304 which debits charges relative to a bank account or other designated account. The payment mechanism 1300 may be a bank account 1306. The payment mechanism 1300 may be a peer-to-peer payment account 1308 or may be a crypto currency account 1310. Each such payment mechanisms 1300 will have identifiers that uniquely identify the associated accounts.

Figure 14:
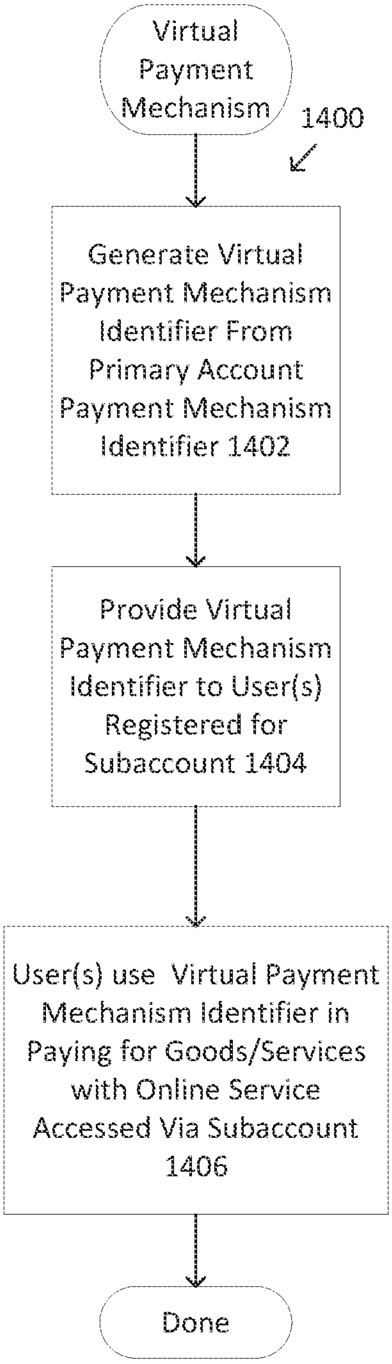
FIG. 14 depicts a flowchart of illustrative steps that may be performed relative to a virtual payment mechanism for a subaccount in exemplary embodiments.

FIG. 14 depicts a flowchart 1400 of illustrative steps that may be performed in exemplary embodiments relative to a virtual payment mechanism for a subaccount. At 1402, a virtual payment mechanism identifier is generated from the primary account mechanism identifier. For example, if the primary account payment mechanism is a credit card, the credit card number is used to derive a virtual credit card number for the subaccount. A number of different techniques may be used to perform this derivation. For example, tokenization may be employed (e.g., using a one-way tokenization function that is based on characteristic account information.). As another example, a signature (private key) or reverse signature (public key) may be used to perform the derivation. At 1404, the virtual payment mechanism identified is provided to user(s) registered for the subaccount. In this way, the users know what virtual payment mechanism identifier to use when making payments via the subaccount. At 1406, the user(s) uses/use the virtual payment mechanism identifier and paying for goods or services with the online service that is accessed via a subaccount. Since each subaccount has its own virtual payment mechanism with an associated virtual payment mechanism identifier, it is easy to track payment activity by subaccount and by user.

Figure 15A:
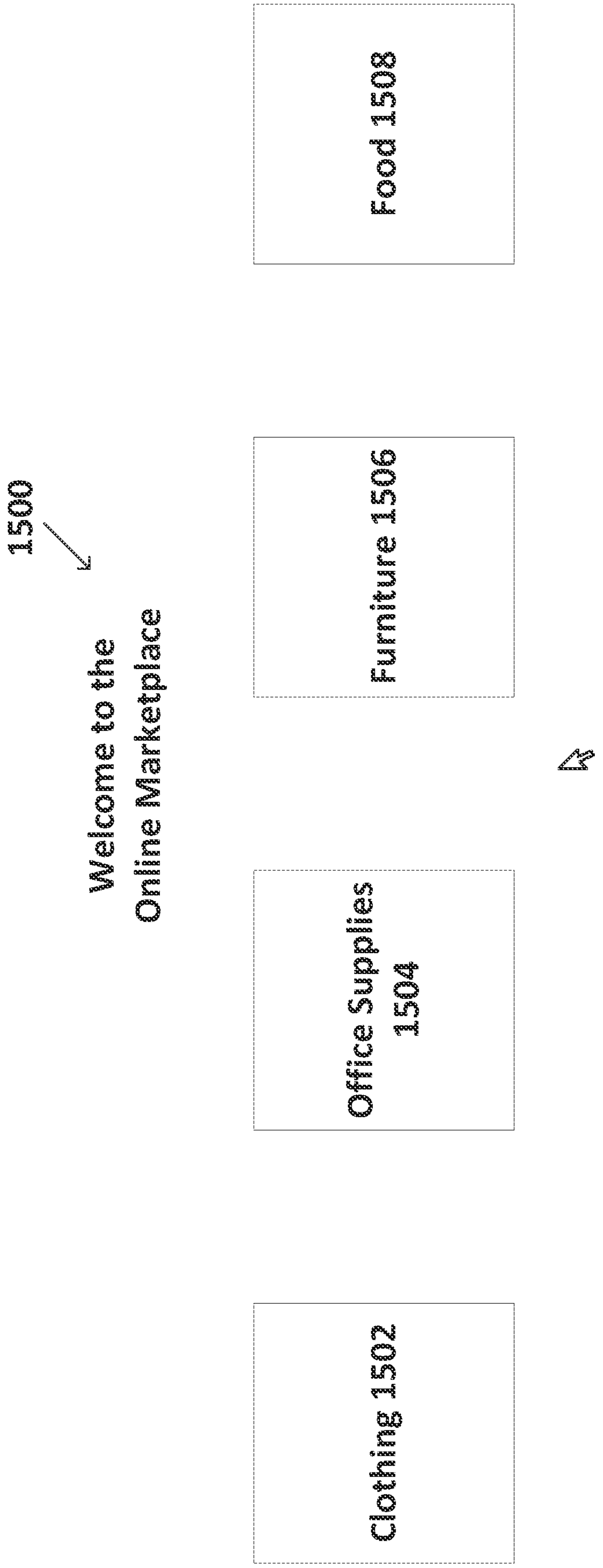
FIGS. 15A, 15B and 15C depict different versions of a webpage for an online service that are available to subaccounts having different modes of access in exemplary embodiments.
Figure 15B:
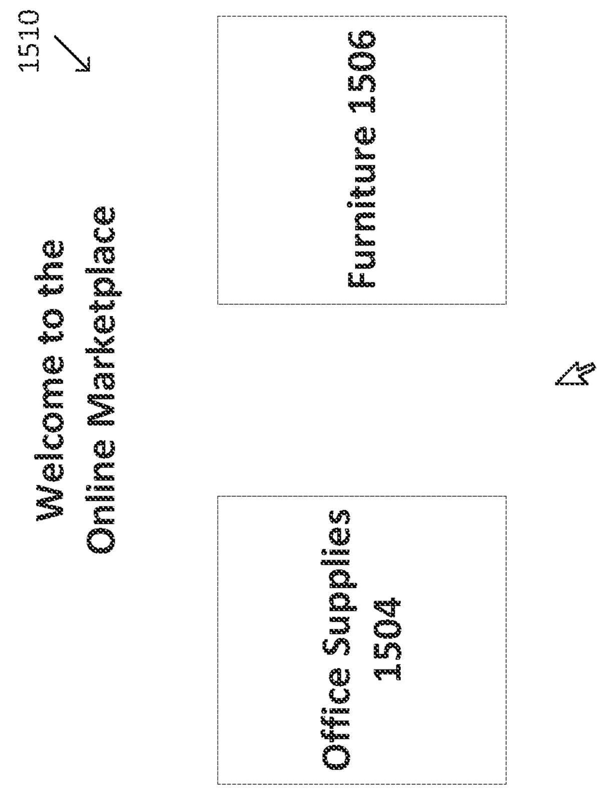
Figure 15C:
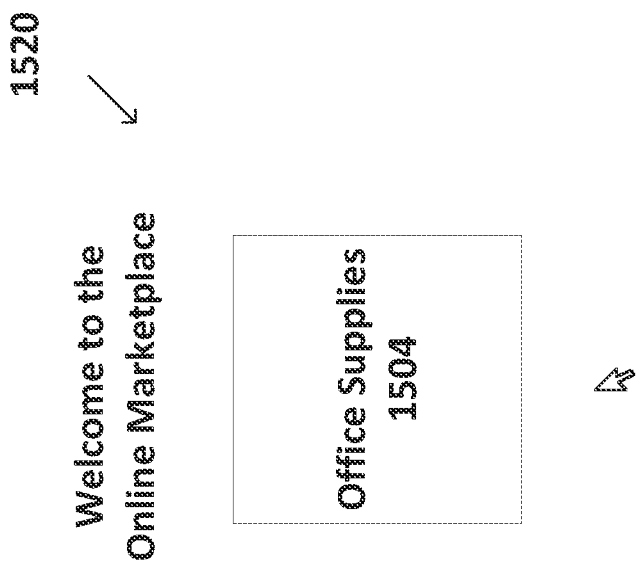

As was discussed above, each subaccount may have a specified mode of access. The mode of access may vary amongst subaccounts. For example, FIG. 15A depicts a web page 1500 of the online service that may be displayed when a user accesses the online service using a first subaccount. As indicated by the text in the webpage 1500, the webpages for an online marketplace through which items may be purchased. The user is displayed the options of purchasing clothing 1502, office supplies 1504, furniture 1506 or food 1508. However, a second user that access the online service via a second subaccount does not have access to as much of the website as the first user. As shown in FIG. 15B, the webpage 1510 for the second user only displays the option of purchasing office supplies 1504 or furniture 1506. The online service accesses the subaccount information and the mode of access information to determine what is displayed to the user. A third user using a third subaccount may have even more limited access to the website. As shown in FIG. 15C, the third user may be shown webpage 1520, which only enables the user to purchase office supplies 1504.

Figure 16A:
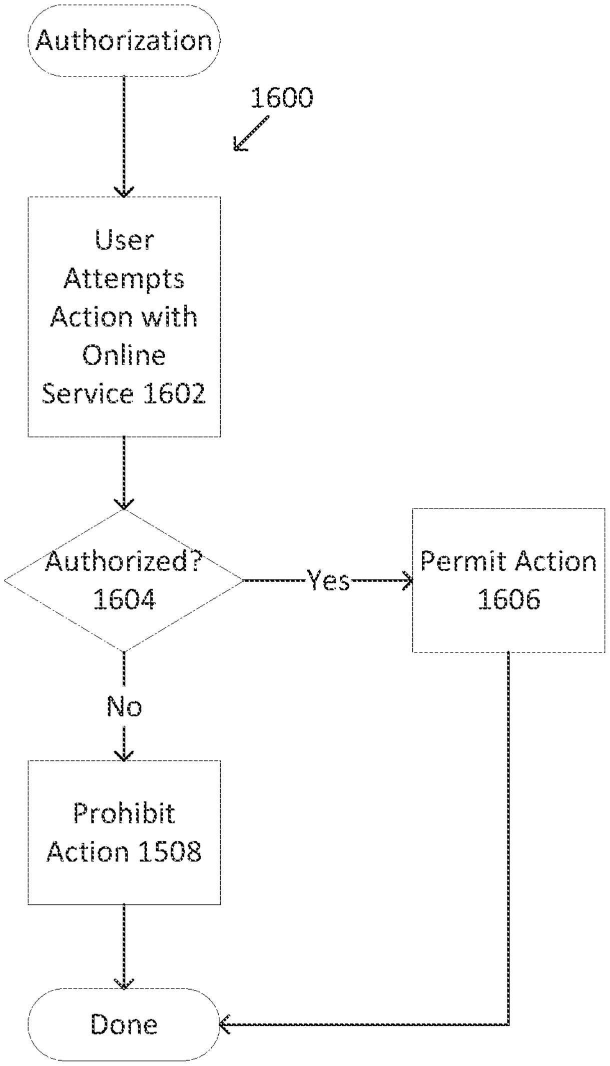
FIG. 16A depicts a flowchart of illustrative steps that may be performed in exemplary embodiments in determining whether a user action with the online service is authorized or not.

FIG. 16A depicts a flowchart 1600 of illustrative steps that may be performed in exemplary embodiments to determine whether user actions are authorized or not with respect to the online service. At 1602, a user attempts an action with the online service. At 1604, the online service determines whether the user is authorized to perform the action or not. The online service may access the mode of access information that is stored for the subaccount to determine whether the user is authorized or not. If the user is authorized, at 1606, the action is permitted. If not, at 1608, the action is prohibited.

Figure 16B:
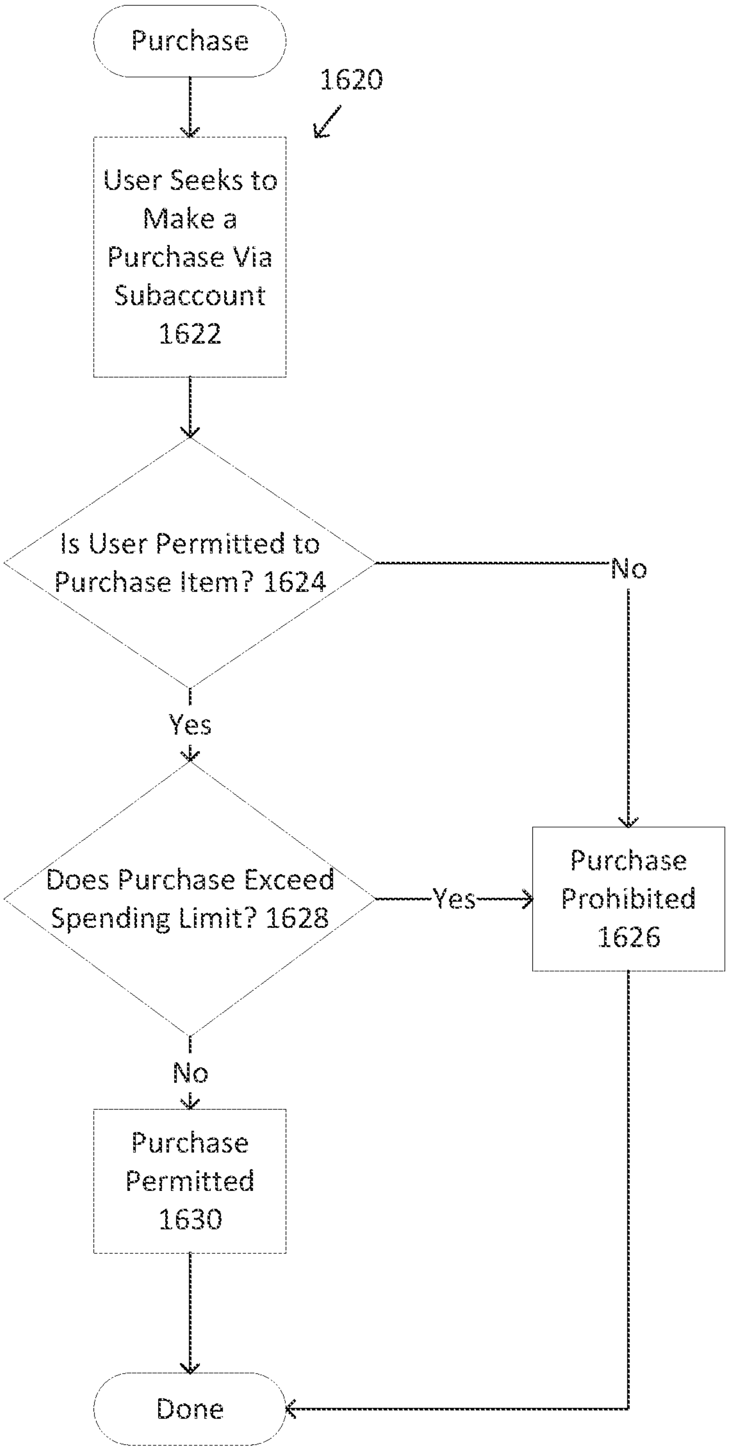
FIG. 16B depicts a flowchart of illustrative steps that may be performed in exemplary embodiments to determine whether a purchase via the online services authorized for a subaccount or not.

FIG. 16B depicts a flowchart 1620 of illustrative steps that may be performed when a user attempts to purchase an item via the online service. At 1622, the user seeks to make a purchase via the subaccount. At 1624, check is made whether the user is permitted to purchase the item that the user wishes to purchase. If not, at 1626, the purchase is prohibited. At 1628, an additional check is made to determine whether the purchase would exceed the spending limit set for the subaccount. If the purchase would exceed the spending limit, at 1626, the purchase is prohibited. If the purchase would not exceed the spending limit, at 1630, the purchase is permitted.

Figure 17:
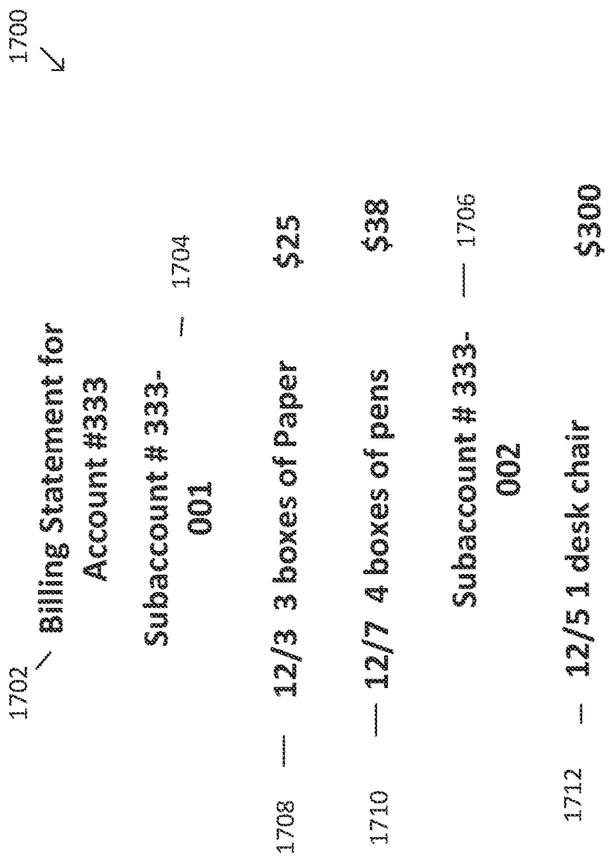
FIG. 17 depicts an example of a billing statement for account of the online service that itemizes purchases by subaccount in exemplary embodiments.

One of the benefits of using subaccounts concerns the ability to display an account for spending on a per subaccount basis. FIG. 17 illustrates an exemplary billing statement 1700 for an account for an online service. The billing statement 1700 includes an identification 1702 of the account number to which the billing state pertains. In this example, the billing statement is for account number 333. The billing statements 1700 includes an itemization for subaccount number 333-001 as indicated by heading 1704. Under the heading 1704 are purchases sorted by date. Each purchase itemizes both a description of the items purchased and the cost. For instance, line 1708 specifies that 3 boxes of paper were purchased on December 3 for $25, and line 1710 specifies that 4 boxes of pens were purchased on December 7 for $38. There also is a heading 1706 for subaccount number 333-002. Underneath that heading 1706 is line 1712, which specifies that a desk chair was purchased on December 5 for $300. The use of the subaccounts and associated virtual payment mechanism identifiers enables the itemization of purchases by subaccounts in the billing statement for the account.

Figure 18:
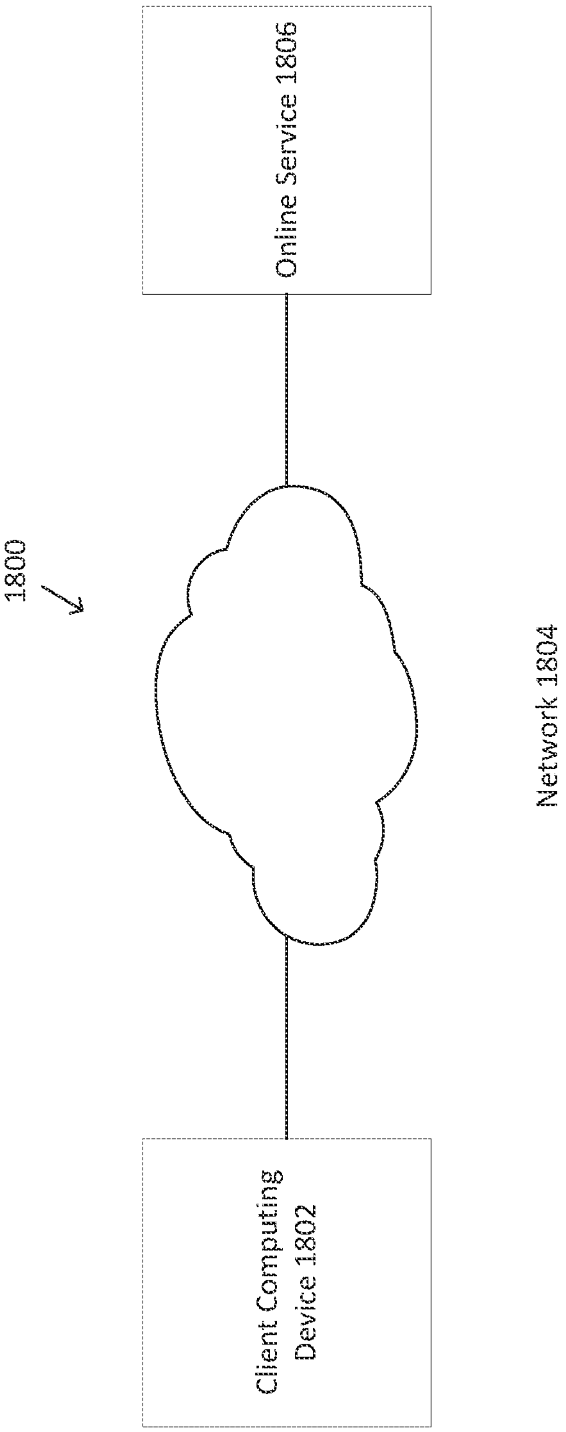
FIG. 18 is a block diagram of a computing environment suitable for practicing exemplary embodiments.

FIG. 18 depicts a computing environment 1800 that is suitable for practicing exemplary embodiments. The user may use a client computing device 1802 to gain access to the online service 1806 over network 1804. The client computing device 1802 may be any of a number of different types of computing devices, including but not limited to a desktop computer, laptop computer, a tablet computer, a smart phone, a smartwatch or other variety of computing device. The network 1804 may include both local area networks and wide area networks. The network 1804 may include the Internet and networks providing access to the Internet. The online service 1806 may be resident on a server computer system and may, in some instances, be provided by cloud computing services.

Figure 19:
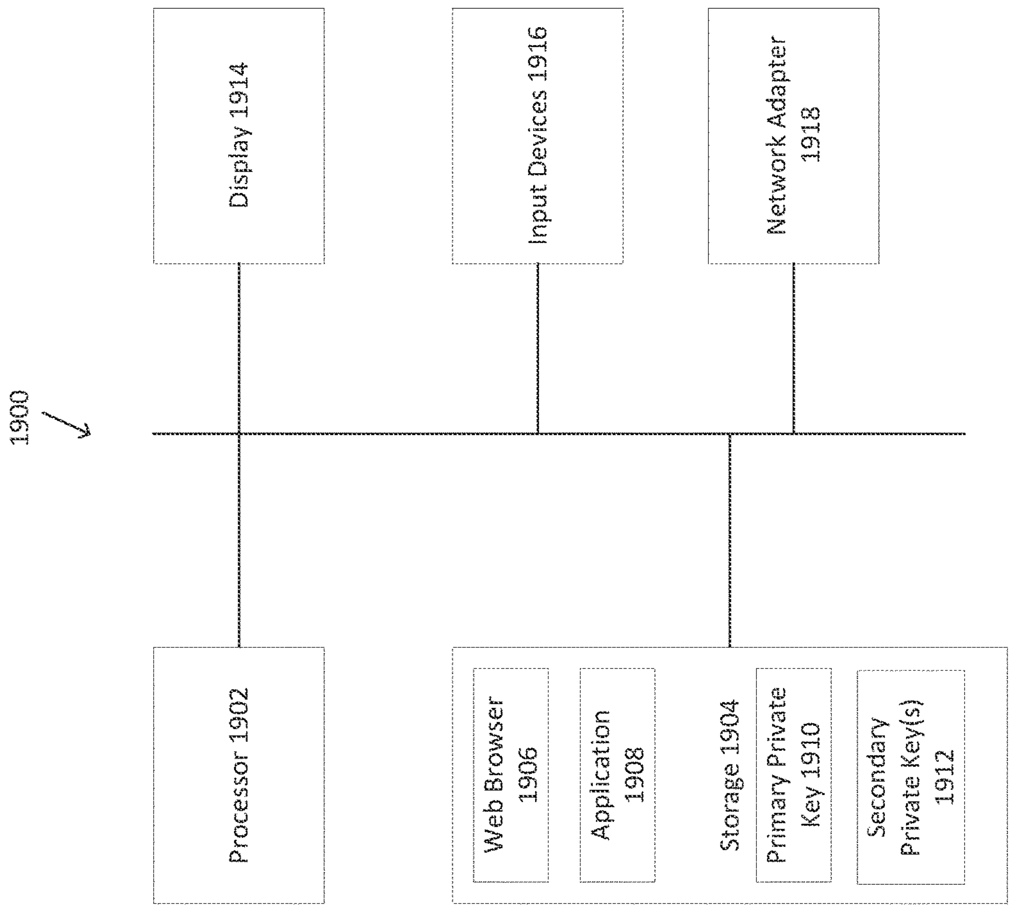
FIG. 19 depicts a block diagram of an illustrative client computing device suitable for practicing exemplary embodiments.

FIG. 19 depicts a block diagram 1900 of a client computing device that is suitable for practicing exemplary embodiments. The client computing device may include a processor 1902. The processor 1902 may be a central processing unit (CPU), a graphics processing unit (GPU), a field programmable gate array (FPGA), an application specific integrated circuit (ASIC) or a combination thereof. Storage 1904 is provided. The storage 1904 may include different types of non-transitory computer-readable storage media. The storage 1904 may include random access memory (RAM), read only memory (ROM), solid state memory, magnetic storage media, optical storage media in other types of storage. The storage 1904 may hold a web browser 1906 for accessing webpages, such as webpages for the online service. The storage 1904 may hold an application 1908 that facilitates access to the online service. The storage 1904 may store a primary private cryptographic key 1910 and secondary private key(s) 1912. The client computing device may include a display 1914, such as a liquid crystal display (LCD), a retina display or a light emitting diode (LED) display. The client computing device 1900 may include input device 1916, such as a keyboard, a microphone, the thumbpad or the like. The client computing device 1900 may include a network adapter, such as an Ethernet adapter or a wireless network adapter, to facilitate access to a network.

Figure 20:
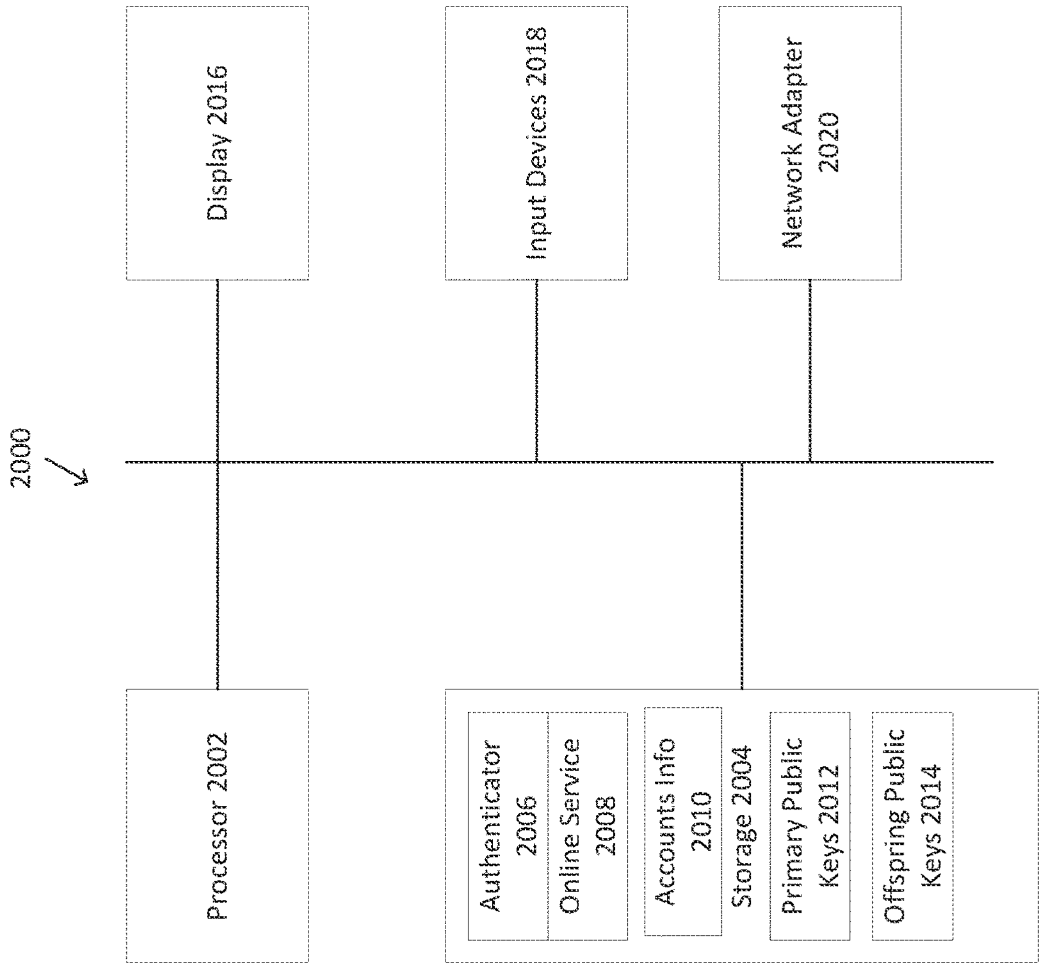
FIG. 20 depicts a block diagram of a computing device that is suitable for executing the online service in exemplary embodiments.

FIG. 20 depicts a block diagram of the computing device 2000 on which the online service is running. The computing device includes a processor 2002, such as that found in the client computing device 1900. The computing device 2000 include storage 2004. The storage 2004 may be of the variety described above relative to the client computing device 1900. The storage 2004 may store an authenticator 2006 that is responsible for performing the user authentication described herein. The storage may store computer programming instructions for the online service 2008. These instructions may be executed by the processor to provide the online service. The online service may provide a series of webpages that are visible to the user. The authenticator 2006 may be part of the online service 2008 in some instances. The storage 2004 may also store accounts information 2010 for each of the accounts and subaccounts, such as described above. The storage 2004 may store the primary public keys 2012 for accounts as well as the offspring public keys 2014 for subaccounts. The computing device 2000 may include a display 2016, input devices 2018 and a network adapter 2020, such as described above relative to the client computing device 1900.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

While exemplary embodiments have been described herein, it should be appreciated that various changes to the exemplary embodiments may be made without departing from the intended scope as defined by the appended claims.

The invention claimed is:

1. A method performed by a processor of a computing device, the method comprising:

receiving, by the processor, at least one user identifier associated with a user;

generating, by the processor, a primary cryptographic key pair comprising a primary private cryptographic key and a primary public cryptographic key;

registering, by the processor, the primary cryptographic key pair with an account of an online service for user authentication when accessing the online service;

sending, by the processor, the primary private cryptographic key to a client computing device via the at least one user identifier;

deriving, by the processor, a secondary cryptographic key pair from the primary private cryptographic key, said secondary cryptographic key pair being for user authentication when accessing the online service and including a secondary private cryptographic key and a secondary public cryptographic key;

registering, by the processor, the secondary cryptographic key pair with a subaccount of the account for the online service, wherein the primary private cryptographic key is registered with the account;

designating, by the processor, the secondary private cryptographic key for a mode of access to the online service that is more limited than a mode of access designated for the primary private cryptographic key;

forwarding, by the processor, the secondary private cryptographic key to the client computing device;

creating a virtual account payment mechanism from a payment mechanism associated with the account, wherein the virtual account payment mechanism has an associated virtual identifier that is derived from an identifier for the payment mechanism; and associating the payment mechanism with the account such that goods or services purchased via the online service using the account are paid via the associated payment mechanism.

2. The method of claim 1, wherein the online service is a website and wherein the secondary private cryptographic key enables access to only a first portion of a plurality of portions of the website, wherein the primary cryptographic key enables access to each of the plurality of portions of the website.

3. The method of claim 1, wherein the online service enables a user to purchase a plurality of goods or services and wherein the mode of access for the subaccount limits purchase of items by the user to a subset of the plurality of goods or services.

4. The method of claim 1, wherein the associated payment mechanism is one of a credit card account, a debit card account, an online payment account, a bank account or a cryptocurrency account.

5. The method of claim 1, further comprising:

associating the virtual account payment mechanism with the subaccount such that goods or services purchased via the online service via the subaccount are paid via the virtual account payment mechanism using the associated identifier.

6. The method of claim 5, wherein the payment mechanism associated with the account is a credit card having a credit card number and the virtual account payment mechanism is a virtual credit card having a virtual credit card number as the associated identifier.

7. The method of claim 1, wherein the mode of access designated for the secondary private cryptographic key includes a spending limit.

8. The method of claim 1, wherein the mode of access designated for the primary private cryptographic key includes modifying the mode of access designated for the secondary private cryptographic key.

9. A method performed by a processor of a computing device, the method comprising:

registering, by the processor, a primary cryptographic key pair with an account of an online service for user authentication when accessing the online service, wherein the primary cryptographic key pair includes a primary private cryptographic key and a primary public cryptographic key;

deriving, by the processor, secondary cryptographic key pairs from the primary private cryptographic key, the secondary cryptographic key pairs being for user authentication when accessing the online service and each of the secondary cryptographic key pairs including a secondary public cryptographic key and a secondary private cryptographic key;

registering, by the processor, at least some of the secondary cryptographic key pairs with respective subaccounts of the account for the online service, wherein the primary private cryptographic key is registered with the account;

designating, by the processor, each of the secondary private cryptographic keys of the registered secondary cryptographic key pairs for a respective mode of access to the online service that is more limited than a mode of access designated for the primary private cryptographic key;

forwarding, by the processor, the registered secondary private cryptographic keys to a client computing device;

creating, by the processor, virtual payment mechanisms from a primary payment mechanism associated with the account for the subaccounts, wherein the virtual payment mechanisms each has an associated virtual identifier that is derived from an identifier for the payment mechanism; and registering respective ones of the virtual payment mechanisms with respective ones of the registered subaccounts for payment for goods or services when accessing the online service via the respective subaccounts.

10. The method of claim 9, further comprising registering the primary payment mechanism with the account for paying for goods or services when accessing the online service via the account.

11. The method of claim 9, wherein the online service is a website and wherein a user accessing the website via first of the registered subaccounts may access only a first portion of a plurality of portions of the website, wherein the user accessing the website via a second of the registered subaccounts may access only a second portion of the plurality of portions of the website that differs at least in part from the first portion.

12. The method of claim 9, wherein a first of the registered subaccounts has a first spending limit specifying how much a user may spend when accessing the online service via the first of the registered subaccounts.

13. The method of claim 12, wherein a second of the registered subaccounts has a second spending limit that differs from the first spending limit.

14. The method of claim 9, further comprising deriving from one of the secondary cryptographic key pairs a tertiary cryptographic key pair for user authentication for the online service for a child account of one of the subaccounts.

15. The method of claim 9, wherein the mode of access designated for the primary private cryptographic key includes modifying the mode of access designated for the secondary private cryptographic key.

16. A method performed by a processor of a computing device, the method comprising:

receiving a request from a requestor to access an online service via a subaccount of an account of the online service;

based on the receiving the request, with the processor, issuing a cryptographic challenge to the requestor;

receiving a response to the challenge;

determining if the response was proper by determining if the response was generated using a secondary private cryptographic key that is registered for the subaccount;

based on a determination that the response was proper, granting the requestor access to online service via the subaccount in accordance with a mode of access permitted for the subaccount, wherein the online service includes receiving a virtual account payment mechanism as payment for a transaction, wherein the virtual account payment mechanism is created from a payment mechanism associated with the account, wherein the virtual account payment mechanism has an associated virtual identifier that is derived from an identifier for the payment mechanism, wherein the virtual account payment mechanism is associated with the subaccount for payment of goods or services purchased via the online service using the subaccount; and based on a determination that the response was improper, denying access to the online service via the subaccount.

17. The method of claim 16, wherein the mode of access permitted for the subaccount specifies what portions of the online service are accessible.

18. The method of claim 16, wherein the mode of access permitted for the subaccount specifies what interactions with the online service are permitted.

19. The method of claim 18, wherein the mode of access permitted for the subaccount specifies what goods or services may be purchased via the online service using the subaccount.

20. The method of claim 18, wherein the mode of access permitted for the subaccount specifies a spending limit for goods or services purchased via the online service using the subaccount.

21. The method of claim 16, further comprising:

receiving a request via the account to modify the mode of access permitted for the subaccount; and modifying the mode of access permitted for the subaccount based on the received request.

* * * * *